(12) United States Patent
Koike et al.

(10) Patent No.: US 6,321,280 B1
(45) Date of Patent: Nov. 20, 2001

(54) SYSTEM LSI HAVING COMMUNICATION FUNCTION

(75) Inventors: Yoshihiko Koike; Koichi Yamamoto, both of Kawasaki (JP)

(73) Assignee: Fujitsu Limited, Kawasaki (JP)

( * ) Notice: Subject to any disclaimer, the term of this patent is extended or adjusted under 35 U.S.C. 154(b) by 0 days.

(21) Appl. No.: 09/241,082

(22) Filed: Feb. 1, 1999

(30) Foreign Application Priority Data

Apr. 20, 1998 (JP) .................................................. 10-109825
Oct. 23, 1998 (JP) .................................................. 10-302972

(51) Int. Cl.[7] .................................................... G06F 13/00
(52) U.S. Cl. ............................................. 710/52; 710/48
(58) Field of Search .............................. 710/5–9, 36–57, 710/260–268; 375/372

(56) References Cited

U.S. PATENT DOCUMENTS

| | | | |
|---|---|---|---|
| 5,301,279 | * | 4/1994 | Riley et al. ............................ 710/41 |
| 5,842,044 | * | 11/1998 | No ......................................... 710/53 |
| 5,911,077 | * | 6/1999 | Anderson ............................. 710/268 |
| 6,118,835 | * | 9/2000 | Barakat et al. ...................... 375/372 |
| 6,189,075 | * | 2/2001 | Sanches ............................... 711/141 |
| 6,226,698 | * | 5/2001 | Yeung et al. ......................... 710/57 |

\* cited by examiner

*Primary Examiner*—Christopher B. Shin
(74) *Attorney, Agent, or Firm*—Staas & Halsey LLP

(57) ABSTRACT

An LSI device comprises: an FIFO buffer in which transmitting data is written, and from which the transmitting data is output in the order of the writing; a controller for transmitting the transmitting data to the FIFO buffer in response to a write interrupt signal; and an FIFO controller for generating and outputting the write interrupt signal to the controller in accordance with a state wherein the FIFO buffer is empty, and for variably setting a variable interval for the write interrupt signal. According to the present invention, since the FIFO controller can generate the write interrupt signal in accordance with the state wherein the FIFO buffer is empty, and can set a variable interval for the write interrupt signal, an optimal writing process for the system can be implemented, and the frequency at which communication errors occur can be reduced.

6 Claims, 22 Drawing Sheets

FIG. 4A CASE 1
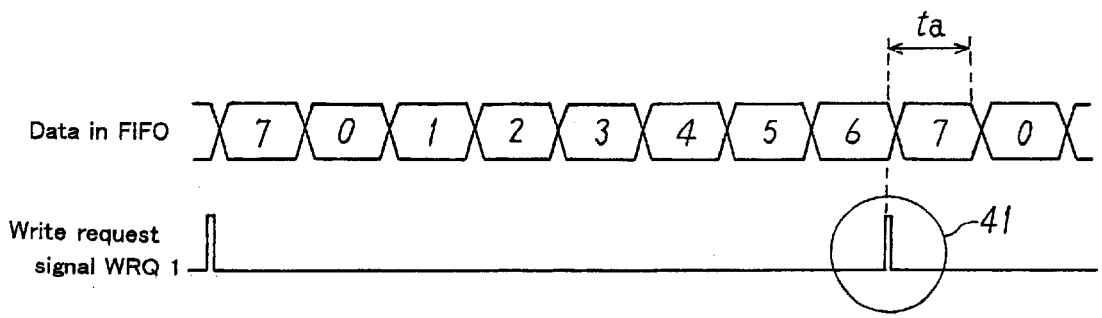
FIG. 4B CASE 2
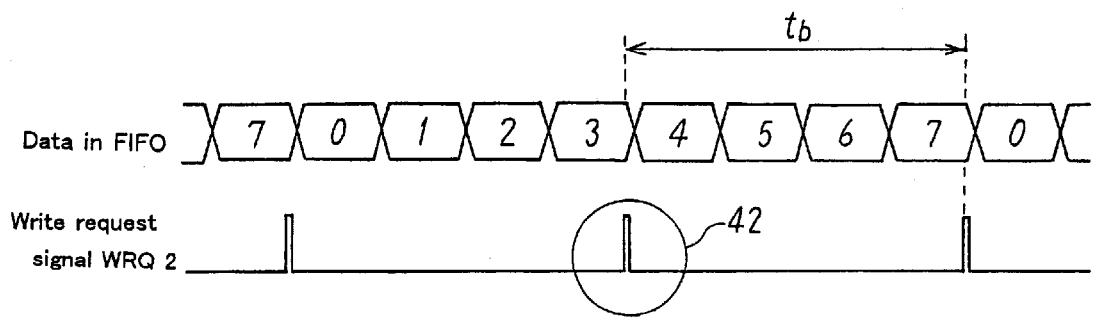
FIG. 4C CASE 3
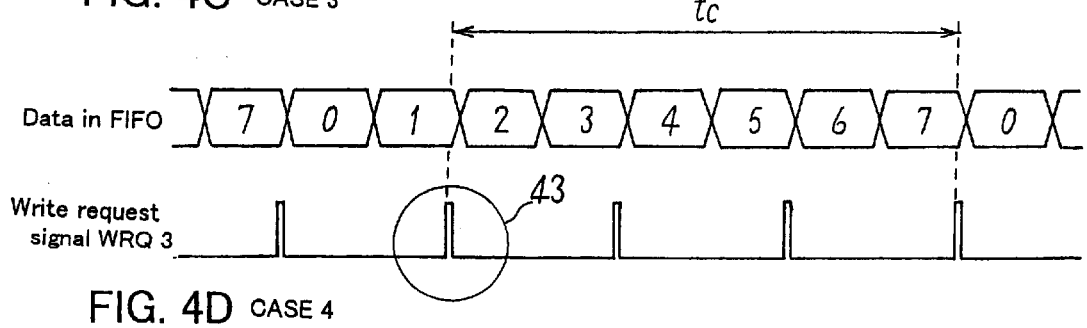
FIG. 4D CASE 4
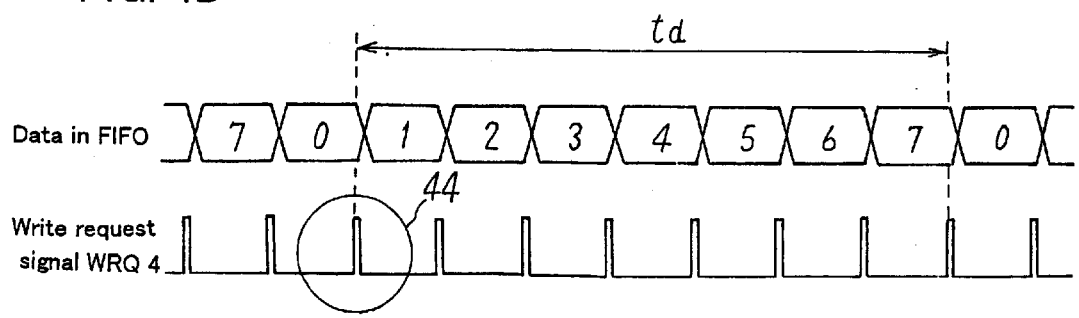

CASE 1

FIG. 5A

31 Write pointer    34 FIFO    32 Read pointer

| 0 | 0 | 0 |

| 0 |
|---|
| 1 |
| 2 |
| 3 |
| 4 |
| 5 |
| 6 |
| 7 |

| 0 | 0 | 0 |

FIG. 5B

31 Write pointer    34 FIFO

| 0 | 0 | 0 |

| 0 |
|---|
| 1 |
| 2 |
| 3 |
| 4 |
| 5 |
| 6 |
| 7 |

32 Read pointer

← | 1 | 1 | 1 | ← | 0 | 0 | 0 |

Output WRQ 1 when $|WP-RP| \geq 7$

CASE 2
FIG. 6A
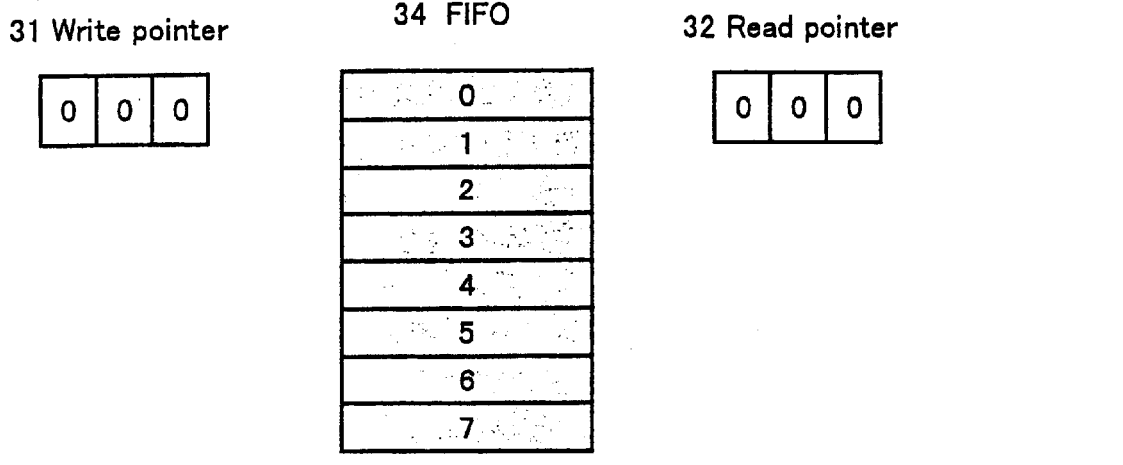
FIG. 6B
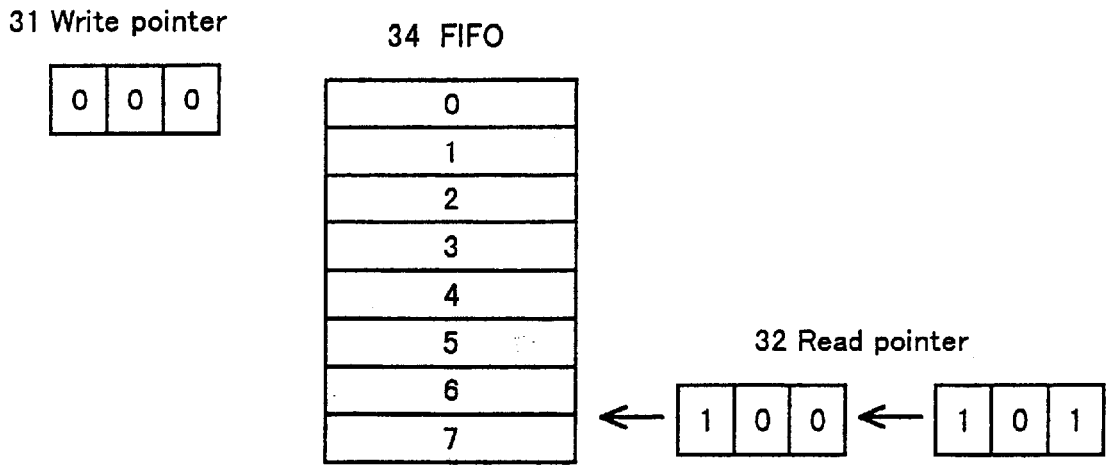
Output WRQ2 when |WP-RP| ≧4

CASE 3
FIG. 7A
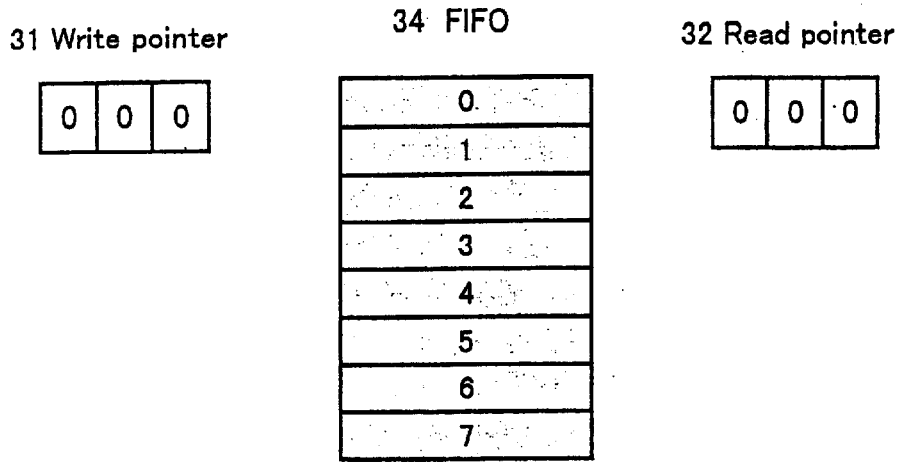
31 Write pointer     34 FIFO     32 Read pointer
FIG. 7B
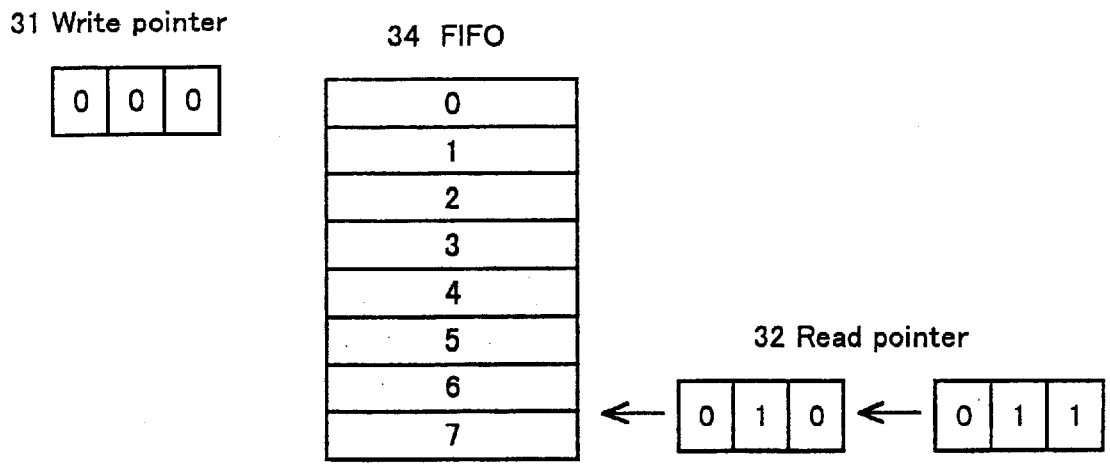
31 Write pointer     34 FIFO     32 Read pointer
Output WRQ3 when $|WP-RP| \geq 2$ CASE 4
FIG. 8A
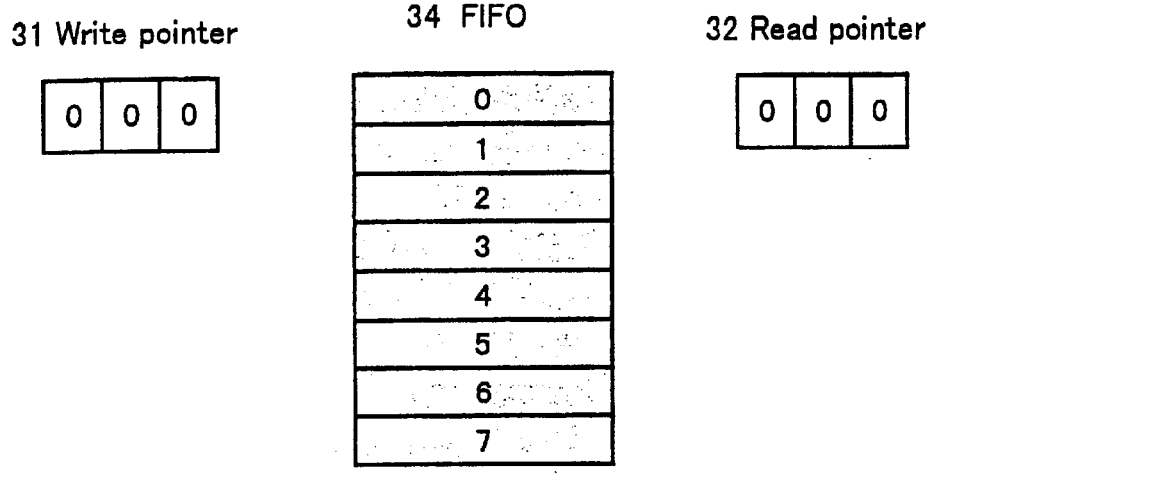
FIG. 8B
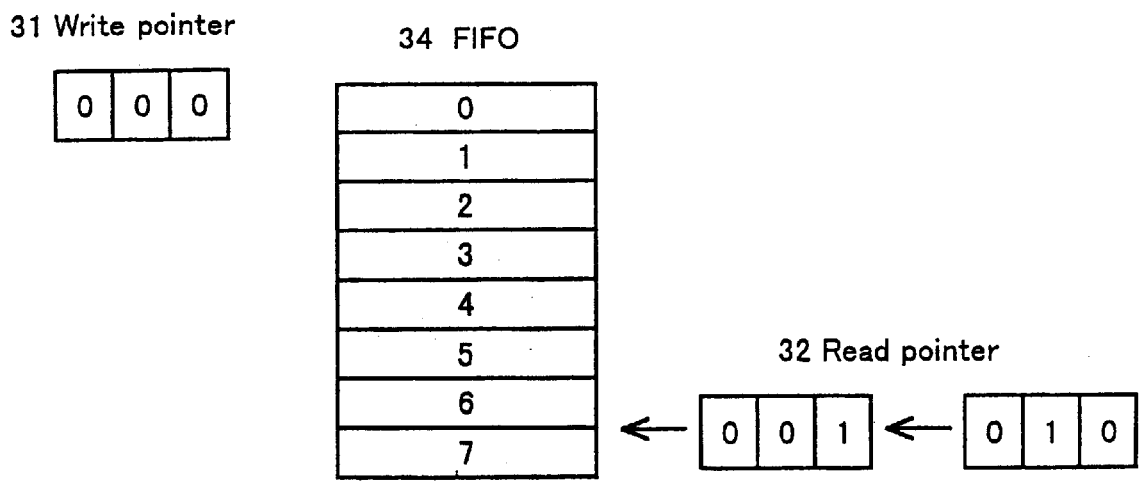
Output WRQ4 when |WP−RP| ≧ 1

DATA TRANSMISSION

COMMUNICATION MACRO INCLUDING INTERRUPT FLAG CIRCUIT

DATA RECEPTION (WRITTING) ( I )

RECEPTION FORMAT

BUFFER 102 WHILE RECEIVING

BUFFER 102 WHEN RECEIVED

DATA RECEPTION (READING OUT)(II)

BUFFER 102 WHEN DIVIDED

TIMING CHART FOR READING DATA FROM BUFFER 102

DATA RECEPTION (READING OUT)(III)

BUFFER 102 AT t4

BUFFER 102 AT t8

BUFFER 102 WHEN COMPLETED READING

DATA TRANSMISSION (WRITTING)( I )

BUFFER 102 BEFORE WRITTING

TIMING CHART FOR WRITTING DATA INTO BUFFER 102

DATA TRANSMISSION (WRITTING) (II)

BUFFER 102 AT t4

BUFFER 102 AT t8

DATA TRANSMISSION (READING OUT) (III)

BUFFER 102 WHEN COMPLETED WRITTING

TRANSMISSION FORMAT

BUFFER 102 WHEN COMPLETED TRANSMISSION

ANOTHER EMBODIMENT

DATA FORMAT

RECEIVING DATA INTO BUFFER 182

SYSTEM LSI HAVING COMMUNICATION FUNCTION

BACKGROUND OF THE INVENTION

1. Field of the Invention

The present invention relates to a semiconductor device for which a communication function has been provided, and in particular to a system LSI chip into which a transmission FIFO buffer has been incorporated.

2. Related Arts

Recently, a number of different data communication protocols have been developed, and a variety of dedicated semiconductor devices have been manufactured to implement these protocols. Incorporated in these semiconductor devices, for example, system LSI chips, are communication macro circuits and, somewhat less frequently, FIFO buffers for storing data to be transmitted are included in the communication macro circuits.

The overall control of a system, which is connected together by a communication macro circuit, is provided by a control unit, such as a micro-controller, which is incorporated into the system LSI. In order to improve the overall performance of the system, a process involving the writing of transmission data in an FIFO buffer must be efficiently performed.

Conventionally, when a transmission FIFO buffer contains no data for transmission, a communication macro circuit transmits a data write request to a micro-controller, which thereafter writes in the FIFO buffer those data which are to be transmitted next.

However, in a large system, a micro-controller performs not only the transmission of data but also a process having a higher priority, such as a timer interrupt process, within a specific time interval. Therefore, the transmission process and the other process having a higher priority may be performed at the same time.

In this case, since the process having a higher priority is performed first, even when a write request from the communication macro circuit has been received, the micro-controller can not write transmission data in the FIFO buffer within a predetermined period of time, so that the FIFO buffer becomes empty and a communication error occurs.

In order to avoid the occurrence of communication errors in a system which performs a large amount of processing, software countermeasures are conventionally employed whereby data are written in an FIFO buffer not only following the reception of a write request from a communication macro circuit, but also periodically, in order to ensure that the FIFO buffer does not become empty.

That is, in addition to a write request output by the communication macro circuit, an interrupt having a very high priority, such as a timer interrupt, is employed to force the micro-controller to write data in the FIFO buffer.

However, in a system for which the amount of processing has been increased, if a communication process is monitored by employing a timer interrupt in addition to a write request output by a communication macro circuit, the software processing will be complicated.

On the contrary, if a timer interrupt is not used and a write request is issued only when an FIFO buffer has become empty, communication errors will occur more frequently in accordance with the increase in the amount of processing which is performed.

As a second problem, a communication protocol, wherein a data format and a communication speed are defined, is employed for the communication of data among the devices, such as an integrated circuit like a microcomputer and a host computer or a periphery device.

Although the communication protocol tends to be complicated and the communication speed tends to be increased, the processing speed of an integrated circuit, which receives or transmits data, can not be increased so that it catches up with the communication speed. Therefore, a buffer, such as an FIFO buffer, is provided for the integrated circuit for the temporary storage of data which are to be transmitted or which are received. The stored data are processed in accordance with the processing speed of the integrated circuit to thus resolve the problem posed by a difference in the communication and the processing speeds.

FIGS. 21A to 21C are operational diagrams (I) for conventional data communication. An explanation will now be given for a case where, as is shown in FIG. 21A, an integrated circuit 100, including a CPU 180, a RAM 181 and a buffer 182, exchanges data with a host computer 201 via a communication line 202.

When the integrated circuit 100 receives data from the host computer 201, the data format consists of a data string 101 composed of a number a of bytes of data A, a number b of bytes of data B, and a number c of bytes of data C, as is shown in FIG. 21B. If, as is shown in FIG. 21C, the buffer 182 of the integrated circuit 100 has a memory capacity of (a+b+c) bytes, the entire data string 101 can be stored temporarily.

The entire data string 101, which is temporarily stored in the buffer 182, is then transmitted to the RAM 181 of the integrated circuit 100, and the data represented by each byte count which is determined in accordance with the communication protocol is interpreted and disposed by software.

FIG. 22 is an operating diagram (II) for conventional data communications for which a plurality of buffers is used. In this example, a plurality of buffers 185, 186 and 187, for which the memory capacity in bytes is defined in accordance with the communication protocol, and a data distribution circuit 189, for counting the bytes of the received data and for distributing the data to buffers having adequate sizes, are provided for an integrated circuit 100. For each set of bytes defined in accordance with the communication protocol, the data distribution circuit 189 assigns a different data writing destination buffer. In this manner, the data which are received and are temporarily stored in the buffers 185, 186 and 187 can be processed independently, and the efficiency of the data processing can be increased.

Following this, an explanation will be given for the transmission of data from the integrated circuit 100 to the host computer 201. When a single buffer 182 is employed, as is shown in FIG. 21, transmission data are arranged in order in the RAM 181 in accordance with the format defined by the communication protocol, and are transferred to the buffer 182 to be output externally.

When a plurality of buffers are employed, as in FIG. 22, the transmission data are written in the buffers 185, 186 and 187, the number and the size of which are determined in accordance with the format defined by the communication protocol. When the writing is completed, data are read from the buffers 185, 186 and 187 in order, as determined by the format, and are then transmitted.

In the example shown in FIG. 21, where a single buffer is provided for the integrated circuit, in data reception processing, data which are received and temporarily stored in the single buffer are transferred to a memory, such as the RAM, and the data represented by each byte count which is determined in accordance with the communication protocol are interpreted by using software. In data transmission processing, data to be transmitted are arranged in order in the memory, such as a RAM, and are transferred to the buffer.

These conventional methods are effective so long as the format defined by the communication protocol is fixed. However, when there are a plurality of types of transmission and reception formats according to a plurality of communication protocols, it is difficult to change for each format the writing destination and the reading destination in the buffer. And when it is difficult to change the hardware, software must be employed, so that the load imposed on the software is increased and the efficiency of the system processing is deteriorated.

When, as is shown in FIG. 22, a plurality of buffers are provided in an integrated circuit, accordingly, a plurality of sets of buffers are required in order to comply with the plural data format for the plural communication protocols. Thus, as the number of buffers increases, the size of the integrated circuit is likewise increased.

SUMMARY OF THE INVENTION

To resolve the above shortcomings, it is one objective of the present invention to provide a system LSI which does not require a periodical writing process using a timer interrupt for an FIFO buffer, and which avoids the condition wherein a communication error occurs.

It is another objective of the present invention to provide an integrated circuit device which imposes a minimum load on software, even when a plurality of formats are defined by communication protocols, and which can perform a process or a setup corresponding to these formats merely by employing a comparatively easy hardware switching process.

To achieve the above objectives, according to the present invention an LSI device comprises:

an FIFO buffer in which transmitting data is written, and from which the transmitting data is output in the order of the writing;

a controller for transmitting the transmitting data to the FIFO buffer in response to a write interrupt signal; and an FIFO controller for generating and outputting the write interrupt signal to the controller in accordance with a state wherein the FIFO buffer is empty, and for variably setting a variable interval for the write interrupt signal.

According to the present invention, since the FIFO controller can generate the write interrupt signal in accordance with the state wherein the FIFO buffer is empty, and can set a variable interval for the write interrupt signal, an optimal writing process for the system can be implemented, and the frequency at which communication errors occur can be reduced.

When the amount of processing performed by the system is large, the interval allocated for the write interrupt signal is set to be narrowed, and the frequency at which communication errors occur can be reduced. And when the amount of processing performed by the system is small, the interval allocated for the write interrupt signal is set to be expanded and the frequency at which the write interrupt is supplied to the system can be reduced.

In the LSI device according to the above invention, the FIFO controller includes:

a write request generation circuit for generating a first write request signal when the FIFO buffer a first empty state, and for generating a second write request signal when the FIFO buffer is a second empty state of which the size of the empty area is larger than that in the first empty state; and a selector for selecting either the first or the second write request signal generated by the write request generation circuit, and for outputting the write interrupt signal which is selected.

According to the present invention, the first and the second write request signals, for which different intervals have been provided, are generated in accordance with the state of the FIFO buffer, and a user can be granted the freedom to select a write request signal having an optimal interval for the system. Therefore, the amount of interrupt processing performed by the system can be optimized, and the frequency of the occurrence of communication errors can be considerably reduced.

Further, in the LSI device of the above invention, the FIFO controller includes an interrupt control circuit for, upon receiving an interrupt permission signal from the controller, permitting or inhibiting the output of the write interrupt signal.

According to the present invention, since the output of the write interrupt signal can be permitted or inhibited in accordance with the interrupt permission signal output by the controller, an optimal transmission process for the system can be performed in accordance with the occurrence of another interrupt in the LSI system and with the priority for the another interrupt.

In the LSI device of the above invention, the write request generation circuit generates the first and the second write request signals in accordance with the relationship existing between a write pointer, for pointing to a write area in the FIFO buffer, and a read pointer, for pointing to a read area in the FIFO buffer.

According to the present invention, a write pointer and a read pointer are employed to generate a plurality of types of write interrupt signals which correspond to the sizes of empty areas.

In the LSI device of the above invention, the interval for the write interrupt signal varies in accordance with the assigned priority for a different interrupt signal which is input to the controller.

According to the present invention, since the interval for the write interrupt signal varies in accordance with the priority assigned to another interrupt signal, which is input to the controller, the interval for a write interrupt signal is dynamically changed in accordance with the processing capabilities of the system. Thus, the frequency at which communication errors occur can be considerably reduced, and the processing efficiency of the entire system can be increased.

In the LSI device of the above invention, when the different interrupt signal having a higher priority than the write interrupt signal, occurs at a first frequency, the selector selects the first write request signal, and when the different interrupt signal occurs at a second frequency lower than the first frequency, the selector selects the second write request signal.

According to the present invention, the selector can select the interval for a write request signal in accordance with the frequency at which an interrupt signal having a higher priority occurs. Therefore, the interval for a write request signal can be dynamically changed in accordance with the processing capabilities of the system, the frequency at which communication errors occur can be considerably reduced, and the processing efficiency of the entire system can be increased.

Further, to achieve the above objectives, an integrated circuit device comprises:

a buffer for temporarily storing transmitting data and received data;

a undivided address setup unit for setting an address for the buffer when the buffer is not divided;

a plurality of sub-buffer address setup units, provided for individual sub-buffers obtained by logically dividing the buffer, for setting addresses for the sub-buffers;

a size setup unit for setting the sizes of the sub-buffers; and an address setup controller for setting address areas for the sub-buffers in the sub-buffer address setup units in accordance with the sizes of the sub-buffers which is set in the size setup unit, for validating the address in the undivided address setup unit when the buffer is not sub-divided, and for validating the addresses in the undivided address setup unit when the buffer has been sub-divided, wherein the transmitting data and the received data are written in or read from the undivided buffer in accordance with the address in the undivided address setup unit, and the transmitting data and the received data are written in or read from the sub-buffers in accordance with the addresses from the corresponding sub-buffer address setup units.

According to the present invention, during the transmission or the reception of data the buffer is undivided and can be used as a single buffer for transmitting and receiving the data. On the contrary, when the received data are read from the buffer, or the transmitting data are written in the buffer, the buffer is divided for use as independent sub-buffers whose sizes correspond to the data format for the reading and the writing of data. Further, the buffer can be divided into arbitrary sizes only by setting the sizes of the sub-buffers in the size setup unit. Therefore, the buffer can be divided into sub-buffers in accordance with different data formats, and a flexible structure can be provided for a transmission/reception buffer.

In addition, the integrated circuit device of the above invention further comprises a memory for storing a communication protocol program having a plurality of data formats, wherein the sizes of the sub-buffers are set in the size setup unit in accordance with the respective data formats.

According to the present invention, when there are a plurality of data formats which conform to the communication protocol, so long as the sizes of the sub-buffers are set by the communication protocol program, the transmission/reception buffer can be configured so as to comply to the data formats. Therefore, the buffer can comply to a variety of different data formats flexibly.

BRIEF DESCRIPTION OF THE DRAWINGS

FIGS. 4A to 4D are diagrams each of which is used for explaining a write request signal interval according to the embodiment of the present invention;

FIGS. 5A and 5B are specific diagrams showing an FIFO, a write pointer and a read pointer for a case 1;

FIGS. 6A and 6B are specific diagrams showing an FIFO, a write pointer and a read pointer for a case 2;

FIGS. 7A and 7B are specific diagrams showing an FIFO, a write pointer and a read pointer for a case 3;

FIGS. 8A and 8B are specific diagrams showing an FIFO, a write pointer and a read pointer for a case 4;

DETAILED DESCRIPTION OF THE PREFERRED EMBODIMENTS

The preferred embodiments of the present invention will now be described while referring to the accompanying drawings. Before beginning, however, it should be noted that the technical scope of the present invention is not limited to these embodiments.

[First Embodiment]

Figure 1:
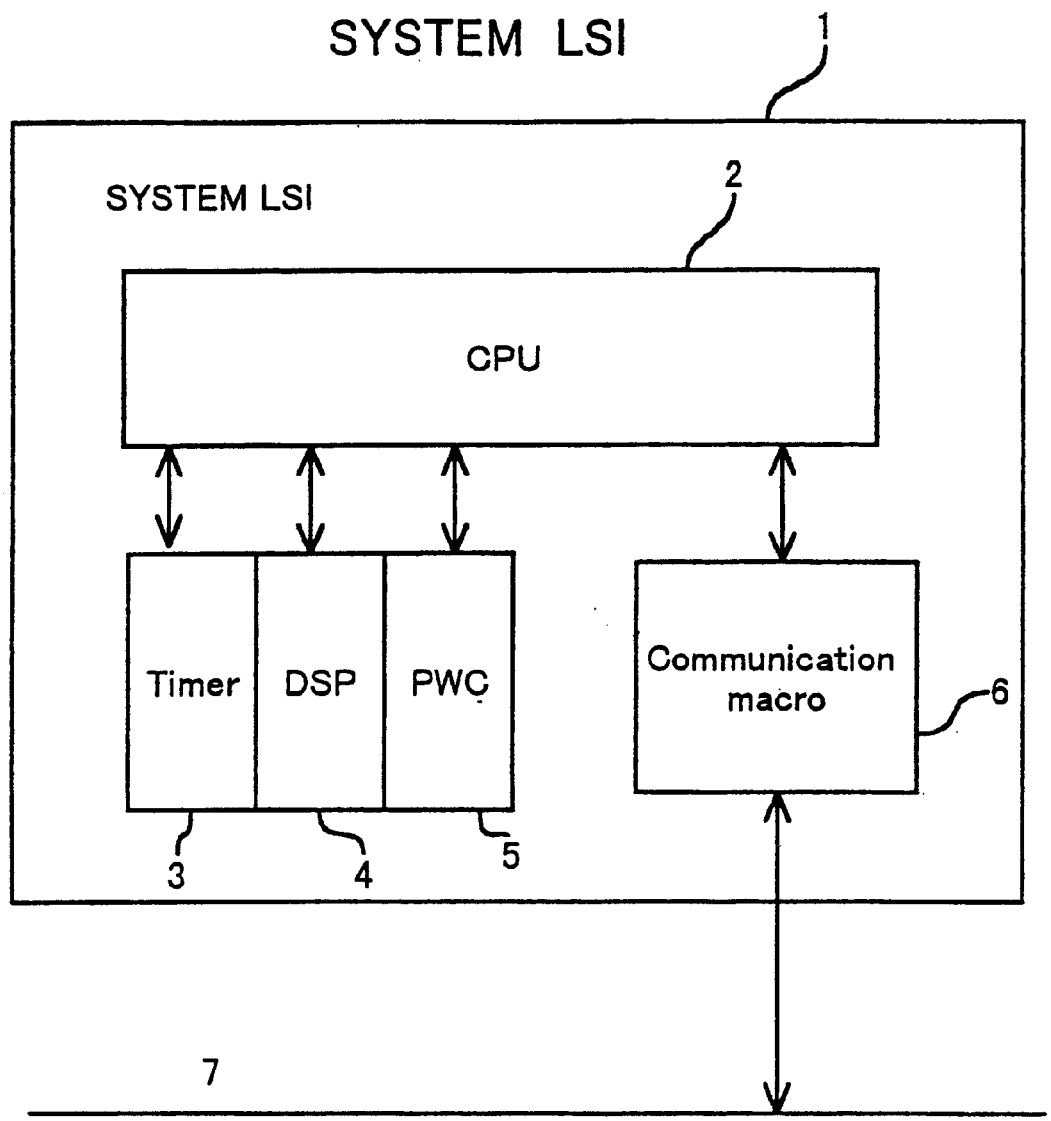
FIG. 1 is a block diagram illustrating a system LSI according to one embodiment of the present invention.

FIG. 1 is a block diagram illustrating a system LSI according to a first embodiment of the present invention. The system LSI 1 comprises: a CPU 2, for providing overall control for the system LSI 1; a timer 3, for generating a predetermined timing signal; a DSP (Digital Signal Processor) 4, for processing at high image data and audio data; a PWC (Pulse Width Counter) 5, for outputting a pulse width signal at a predetermined time interval; and a communication macro circuit 6, for forming a LAN with another system LSI and for exchanging data according to a predetermined protocol.

The communication macro circuit 6 is connected via a double-line bus 7 to a communication macro circuit in another system LSI. The communication macro circuit 6 outputs to the double-line bus 7 data which were written in an incorporated FIFO buffer (not shown) by the CPU 2, and stores, in the FIFO buffer, data which are received from a communication macro circuit of another system LSI as well as outputting them to the CPU 2.

Figure 2:
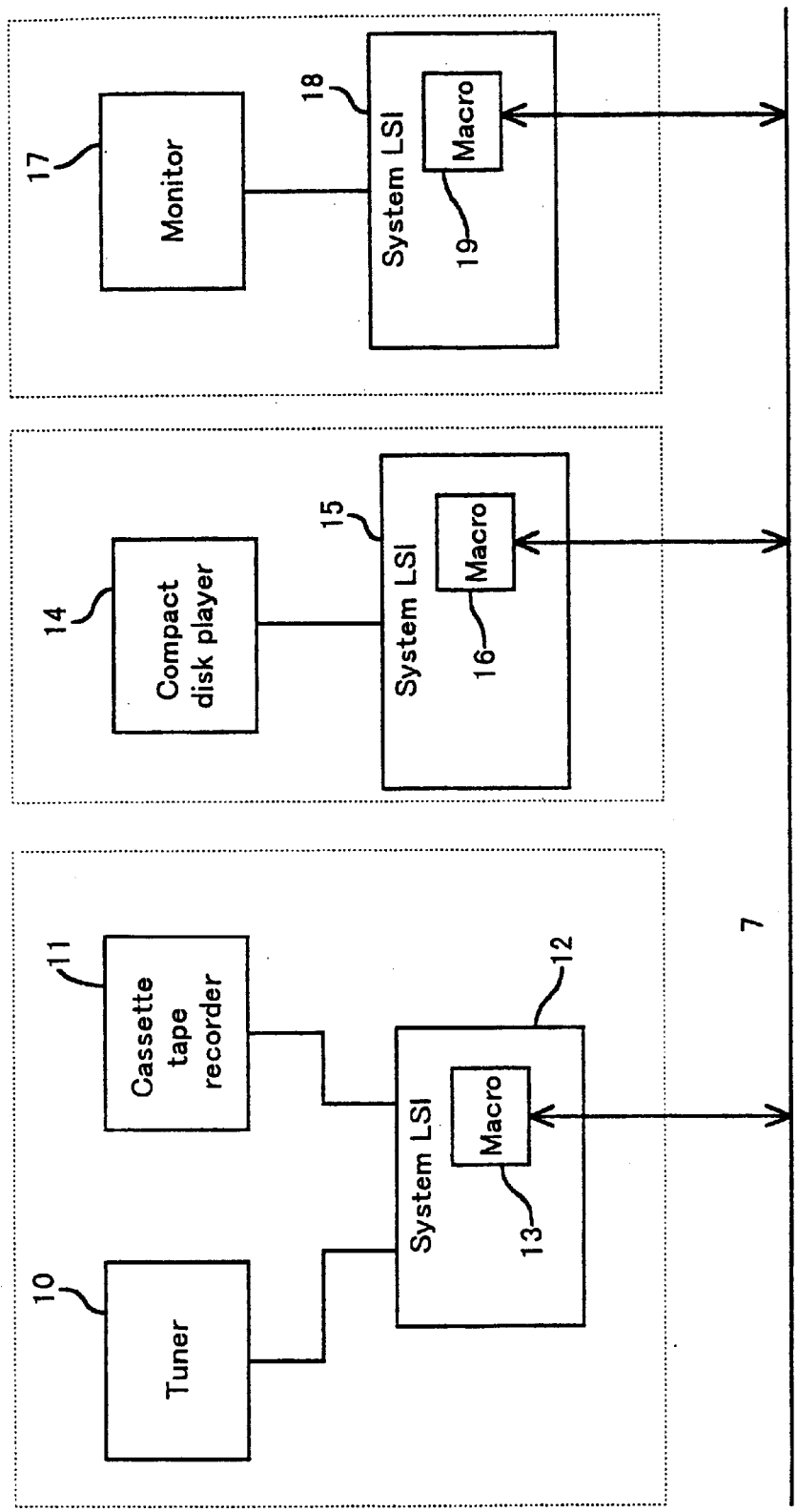
FIG. 2 is a diagram showing the structure of an LAN employing the system LSI according to the embodiment of the present invention.

FIG. 2 is a diagram showing a LAN, for an audio device in a car, which is formed by using the system LSI according to the embodiment of the present invention. A tuner 10 and a cassette tape recorder 11 are controlled by a system LSI 12. When a plurality of system LSIs are used to form a LAN, one of the system LSIs is defined as a master, and the other system LSIs are defined as slaves. In this embodiment, the system LSI 12 serves as a master, and controls not only the tuner 10 and the cassette tape recorder 11, but also the entire system.

A communication macro circuit 13 in the system LSI 12 is connected via the double-line bus 7 to a communication macro circuit 16 of a system LSI 15 for controlling a compact disk player 14, and a communication macro circuit 19 of a system LSI 18 for controlling a monitor 17 of a navigation system or a television set.

The master system LSI 12 serves as the center of an audio system, and, via the communication macro circuit 13 and the double-line bus 7, transmits to the compact disk player 14, for example, control data for activating or halting an operation; and, via the communication macro circuit 16 and the double-line bus 7, receives from the slave system LSI 15 of the compact disk player 14 data indicating which music piece is currently being played. The master system LSI 12 transmits to the slave system LSI 18 of the monitor 17 data for displaying the name of the a music piece which is currently being played.

Figure 3:
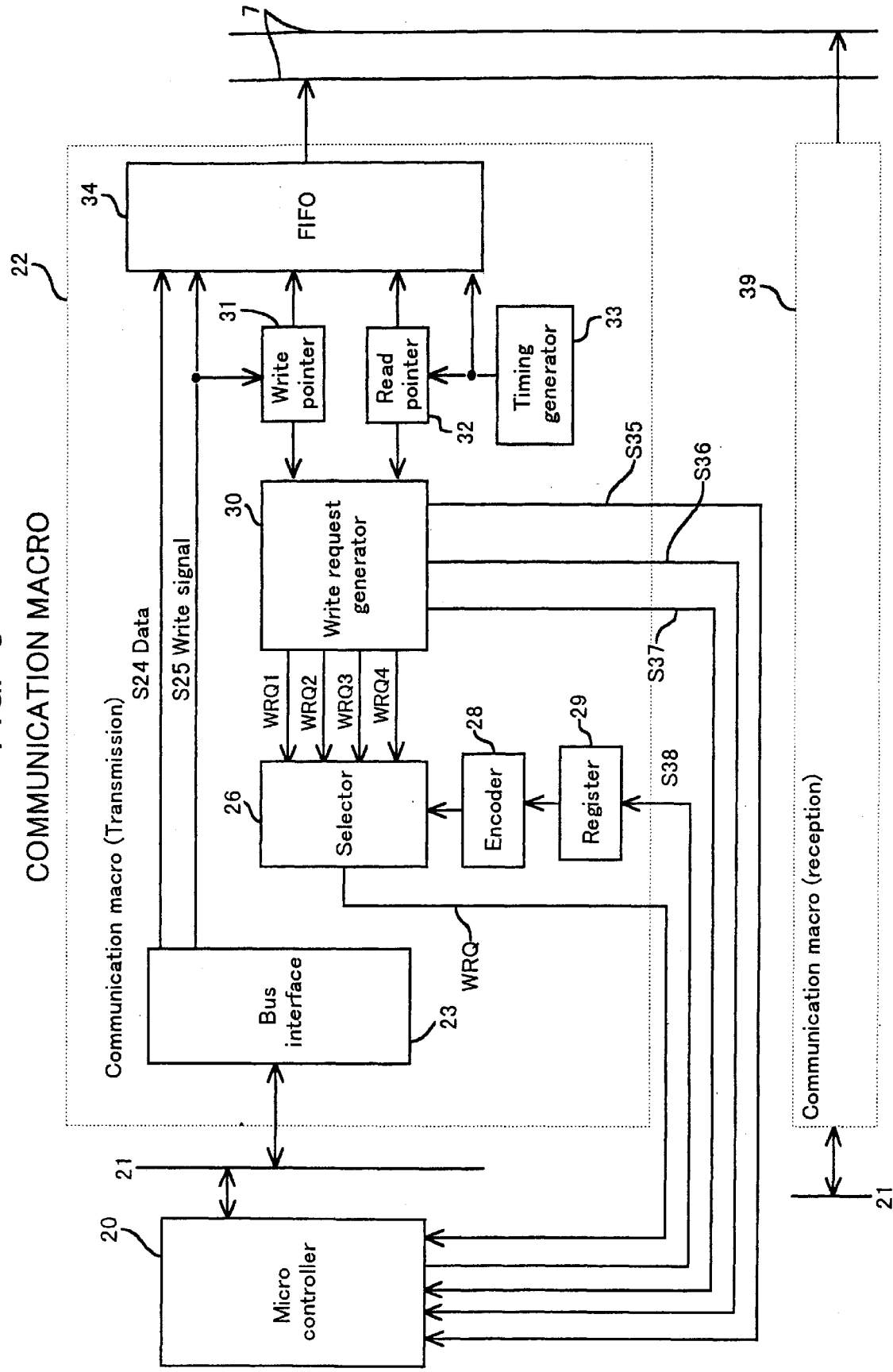
FIG. 3 is a block diagram illustrating a communication macro circuit according to the embodiment of the present invention.

FIG. 3 is a block diagram illustrating a communication macro circuit according to the embodiment of the present invention. A communication macro circuit 22 used for transmission and a communication macro circuit 39 used for reception are incorporated in the circuit; however, since this embodiment is related only to the communication macro circuit 22 for transmission, a block diagram for the communication macro circuit 39 for reception is not shown.

A micro-controller 20 outputs to an internal bus 21 data which are to be transmitted to another LSI, and a write signal relative to an FIFO buffer 34. A bus interface 23, which is connected to the internal bus 21, is employed to output transmission data S24 and a write signal S25 to the FIFO buffer 34.

In this embodiment, the FIFO buffer 34 has a storage area of eight bytes. The data S24 are stored in the FIFO buffer 34 in the order in which they are received, and are output to the double-line bus 7, in accordance with a transmission timing, in the order in which they were received.

The write signal S25 output by the bus interface 23 is also received by a write pointer 31. In this embodiment, the write pointer 31 is a counter consisting of three bits. The write pointer 31 increments by one its count value each time data S24 consisting of one byte is written in the FIFO buffer 34. Therefore, the storage area of the FIFO buffer 34 in which data are written can be monitored by the value of the write pointer 31.

The data S24 stored in the FIFO buffer 34 are output in synchronization with a timing signal S40 generated by a transmission timing generation circuit 33. The timing signal S40 is also transmitted to a read pointer 32, which is a counter consisting of three bits. The read pointer 32 increments its count value by one each time the data S24 are read from the FIFO buffer 34. Therefore, a storage area in which data are read from the FIFO buffer 34 can be monitored by the count value of the read pointer 32. When both the write pointer 31 and the read pointer 32 are monitored, the size of an empty area in the FIFO buffer 34 can be determined.

A write request generator 30 monitors the amount of data stored in the FIFO buffer 34 by employing the count values of the write pointer 31 and the read pointer 32, generates four write request signals WRQ1 to WRQ4 having different time intervals, and outputs these signals to a selector 26.

Further, the write request generator 30 outputs an empty flag signal S35, a full flag signal S36 and an error flag signal S37 to a micro-controller 20. The empty flag signal S35 is output when, for example, the value at the write pointer 31 is (000) and the value at the read pointer 32 is changed from (111) to (000), i.e., when the FIFO buffer 34 is emptied.

The full flag signal S36 is output when, for example, the value at the read pointer 32 is (000) and the value at the write pointer 31 is changed from (111) to (000), i.e., when the FIFO buffer 34 is filled with the data S24 consisting of eight bytes. The error flag signal S37 is a signal for examining data to be transmitted to determine whether they are correct, and is, for example, a parity check signal, a timing signal or an acknowledge signal.

The selector 26 selects one of the write request signals WRQ1 to WRQ4 received from the write request generator 30, and outputs that write request signal WRQ as an interrupt signal to the micro-controller 20. Upon receiving the write request signal WRQ which was issued as an interrupt, the micro-controller 20 accepts it in accordance with the priority assigned for an interrupt, and performs a write/interrupt process at the FIFO buffer 34. When the assigned interrupt priority for the write request signal WRQ is low, the interrupt process is not performed. As will be described later, the write request signal WRQ is selected as a signal having an optimal write interval in order to avoid a condition where the FIFO buffer 34 is emptied and a communication error occurs.

The micro-controller 20 outputs, to a register 29, a selection signal S38 for selecting the optimal write interval for the system. The selection signal S38 input to the register 29 is transmitted via an encoder 28 to the selector 26.

In this embodiment, an optimal write interval for the system can be arbitrary selected by using the selection signal S38 from the micro-controller 20 which is output to the register 29. Therefore, in accordance with the amount of data to be transmitted, the frequency of the transmissions, or the assigned priority for another interrupt signal in the system LSI, the system LSI can select the optimal write interval so as to prevent the occurrence of a communication error which occurs when the FIFO buffer 34 is emptied. It should be noted that if the optimal write interval for the system can be fixed, the value at the register 29 may be stored in a ROM, or a fixed value may be selected by wiring. In even this case, a user of the system LSI can also select the optimal write interval through ROM or wiring.

The communication macro circuit 39 used for reception receives data from another system LSI via the double-line bus 7, and transmits the data via the internal bus 21 to the micro-controller 20.

FIG. 4 is an explanatory diagram showing the relationship between data stored in and read from the FIFO buffer 34, which is incorporated in the communication macro circuit 22, and transmitted, and a write request signal WRQ output by the communication macro circuit 22.

FIGS. 5 to 8 are specific diagrams showing data which are stored in and are read from the FIFO buffer 34 and transmitted, and the values at the write pointer 31 and the read pointer 32. An explanation will now be given, while referring to FIGS. 4 to 8, for a method for outputting the write request signals WRQ at different time intervals in accordance with the values at the write pointer 31 and the read pointer 32.

As was previously described, the FIFO buffer 34 has a storage area of eight bytes. To transmit data sequentially, when data to be transmitted is received one byte by one byte continuously, and each one byte of data is output in the sequential order in which the data bytes have been received. The numbers provided for data signals in the FIFO buffer 34 in FIGS. 4A to 4D are used to designate those signals written in storage regions of the FIFO buffer in FIGS. 5 to 8 for which numbers have been assigned.

In case 1 in FIG. 4A, the write request signal WRQ1 is output when only one byte of data remains in the FIFO buffer 34. That is, the write request signal WRQ1 is output immediately before the transmission of the data which are stored in storage area 7 in the FIFO buffer 34.

The timing at which the write request signal WRQ1 in case 1 is output will now be described while referring to FIGS. 5A and 5B. In the example in FIG. 5A data are written in all the storage areas 0 to 7 of the FIFO buffer 34. The shaded portions indicate storage areas in which data are written.

The value held by the write pointer 31 is (000) when the FIFO buffer 34 is empty. Each time a data byte is received it is stored in order in one of the storage areas 0, 1, 2, etc., and the write pointer 31 is incremented by one. When data bytes have been stored in all the storage areas 0 to 7, the value held by the write pointer 31 is returned to (000). And when the value held by the read pointer 32 is (000) and that held by the write pointer 31 changes from (111) to (000), the above described full flag is output.

In FIG. 5B is shown the timing at which the write request signal WRQ1, which is enclosed by a circle 41 in FIG. 4A, is output. Data in storage areas 0 to 6 of the FIFO buffer 34 have already been read, and only the data in storage area 7 remain.

When data are present only in storage area 7, the value held by the read pointer 32 is (111). When the data are read from the storage area 7, the value held by the read pointer 32 is changed from (111) to (000). The write request signal WRQ1 in case 1 is output when the value held by the write pointer 31 is (000) and that held by the read pointer 32 is changed from (111) to (000). This is the same as the timing at which the empty flag is output.

That is, the write request signal WRQ1 is generated when there are seven empty byte areas in the FIFO buffer 34. Assuming that the value held by the write pointer 31 is WP and the value held by the read pointer 32 is RP, the write request signal WRQ1 is output when $|WP-RP| \geq 7.$ Therefore, the interval at which the write request signal WRQ1 occurs is long, and the frequency at which it occurs is low.

In case 2 in FIG. 4B, the write request signal WRQ2 is output when there are four data bytes remaining in the FIFO buffer 34. That is, the write request signal WRQ2 is output immediately before data read from storage area 4 in the FIFO buffer 34 are transmitted.

The timing at which the write request signal WRQ2 in case 2 is output will now be explained while referring to FIGS. 6A and 6B. In the example shown in FIG. 6A, as well as that shown in FIG. 5A, data are stored in all the storage areas 0 to 7 in the FIFO buffer 34.

In FIG. 6B is shown the timing at which the write request signal WRQ2, which is enclosed by a circle 42 in FIG. 4B, is output. Data in the storage areas 0 to 3 in the FIFO buffer 34 have already been read, and only the data in the storage areas 4 to 7 remain.

The value held by the read pointer 32 is (100), which indicates that storage area 4 is to be read. When the data are read from storage area 4, the value held by the read pointer 32 is changed from (100) to (101). The write request signal WRQ2 in case 2 is output when there are four empty byte areas in the FIFO buffer 34, i.e., when the value held by the write pointer 31 is (000) and that held by the read pointer 32 is changed from (100) to (101). In other words, the write request signal WRQ2 is output when $|WP-RP| \geq 4.$ Therefore, the interval at which the write request signal WRQ2 occurs is shorter than is that at which the signal WRQ1 occurs, and the frequency at which it occurs is higher.

In case 3 in FIG. 4C, the write request signal WRQ3 is output when there are six data bytes remaining in the FIFO buffer 34, i.e., when two bytes of data have been output. That is, the write request signal WRQ3 is output immediately before data read from storage area 2 in the FIFO buffer 34 are transmitted.

The timing at which the write request signal WRQ3 is output in case 3 will now be explained while referring to FIGS. 7A and 7B. In the example shown in FIG. 7A, as well as that shown in FIG. 5A, data are stored in all the storage areas 0 to 7 in the FIFO buffer 34.

In FIG. 7B is shown the timing at which the write request signal WRQ3, which is enclosed by a circle 43 in FIG. 4C, is output. Data in the storage areas 0 and 1 of the FIFO buffer 34 have already been read, and only the data in the storage areas 2 to 7 remain.

The value held by the read pointer 32 is (010), which indicates that storage area 2 is to be read. When the data are read from the storage area 2, the value held by the read pointer 32 is changed from (010) to (011). The write request signal WRQ3 in case 3 is output when there are two empty byte areas in the FIFO buffer 34, i.e., when the value held by the write pointer 31 is (000) and that held by the read pointer 32 has been changed from (010) to (011). That is, the write request signal WRQ3 is output when $|WP-RP| \geq 2.$ Therefore, the interval at which the write request signal WRQ3 occurs is shorter than is that at which the signal WRQ2 occurs, and the frequency at which it occurs is higher.

In case 4 in FIG. 4D, the write request signal WRQ3 is output when there are seven data bytes remaining in the FIFO buffer 34, i.e., when one byte of data had been output. That is, the write request signal WRQ4 is output immediately before data read from storage area 1 in the FIFO buffer 34 are transmitted.

The timing at which the write request signal WRQ4 in case 4 is output will now be explained while referring to FIGS. 8A and 8B. In the example shown in FIG. 8A, as well as that shown in FIG. 5A, data are stored in all the storage areas 0 to 7 in the FIFO buffer 34.

In FIG. 8B is shown the timing at which the write request signal WRQ4, which is enclosed by a circle 44 in FIG. 4D, is output. Data in storage area 0 in the FIFO buffer 34 have already been read, and only the data in the storage areas 1 to 7 remain.

The value held by the read pointer 32 is (001), which indicates that storage area 1 is to be read. When the data are read from the storage area 1, the value held by the read pointer 32 is changed from (001) to (010). The write request signal WRQ4 in case 4 is output when there is one empty byte area in the FIFO buffer 34, i.e., when the value held by the write pointer 31 is (000) and that held by the read pointer 32 is changed from (001) to (010). That is, the write request signal WRQ4 is output when $$|WP-RP| \geq 1.$$

Therefore, the interval at which the write request signal WRQ4 occurs is the shortest, and the frequency at which it occurs is the highest.

As is described above, in case 1 eight bytes are transmitted, and the write request signal WRQ1 is generated immediately before the transmission of the last data. In case 2 four bytes have been transmitted, and the write request signal WRQ2 is generated before the transmission of the remaining four bytes is enabled.

In case 3 two bytes are transmitted, and the write request signal WRQ3 is generated when the writing of two bytes is enabled. In case 4 one byte is transmitted, and the write request signal WRQ4 is generated when the writing of one byte is enabled.

In case 1, while the write request signal WRQ1 occurs less frequently, the maximum time ta at which data must be written before the FIFO buffer 34 is emptied is short. Therefore, unless the data for at least one byte are written within time ta, a communication error occurs.

In case 4, while the write request signal WRQ4 occurs frequently, the maximum time td at which data must be written before the FIFO buffer 34 is emptied is long. Therefore, even if several write request signals WRQ4, which occur within time td, are ignored because of an interrupt having a high priority, a communication error seldom occurs.

In cases 2 and 3, the frequencies at which the write request signals WRQ3 and WRQ4 occur, and the maximum times tb and tc fall between those in cases 1 and 4, so that the advantages and disadvantages of cases 1 and 4 are also those of cases 2 and 3.

In this embodiment, the optimal timing for the write request signals for the system can be obtained by the selection, by the selector 26, of the write request signals WRQ1 to WRQ4. As a result, the probability of the occurrence of a communication error when the FIFO buffer 34 is emptied can be drastically reduced.

In addition, in this embodiment, cases 1 to 4 can be selected by the selection signal S38 which is output to the register 29. Therefore, when there are many other interrupts having a high priority that must be processed, case 4 may be selected because a write request signal for the FIFO buffer 34 will probably be ignored. When, however, there are only a few interrupts having a high priority that must be processed, case 1 will be selected, so that the load can be reduced which is imposed on the controller 20 for the performance of the interrupt process for a write request.

As is described above, according to this embodiment, since a user can freely select the interval and the frequency at which a write request signal for the FIFO buffer 34 is output, the optimal transmission process can be performed for the system.

In this embodiment one of the four write request signals WRQ1 to WRQ4 is selected. However, more write request signals having different occurrence intervals may be generated in order to select a more accurate timing at which to output the write request signal.

Figure 9:
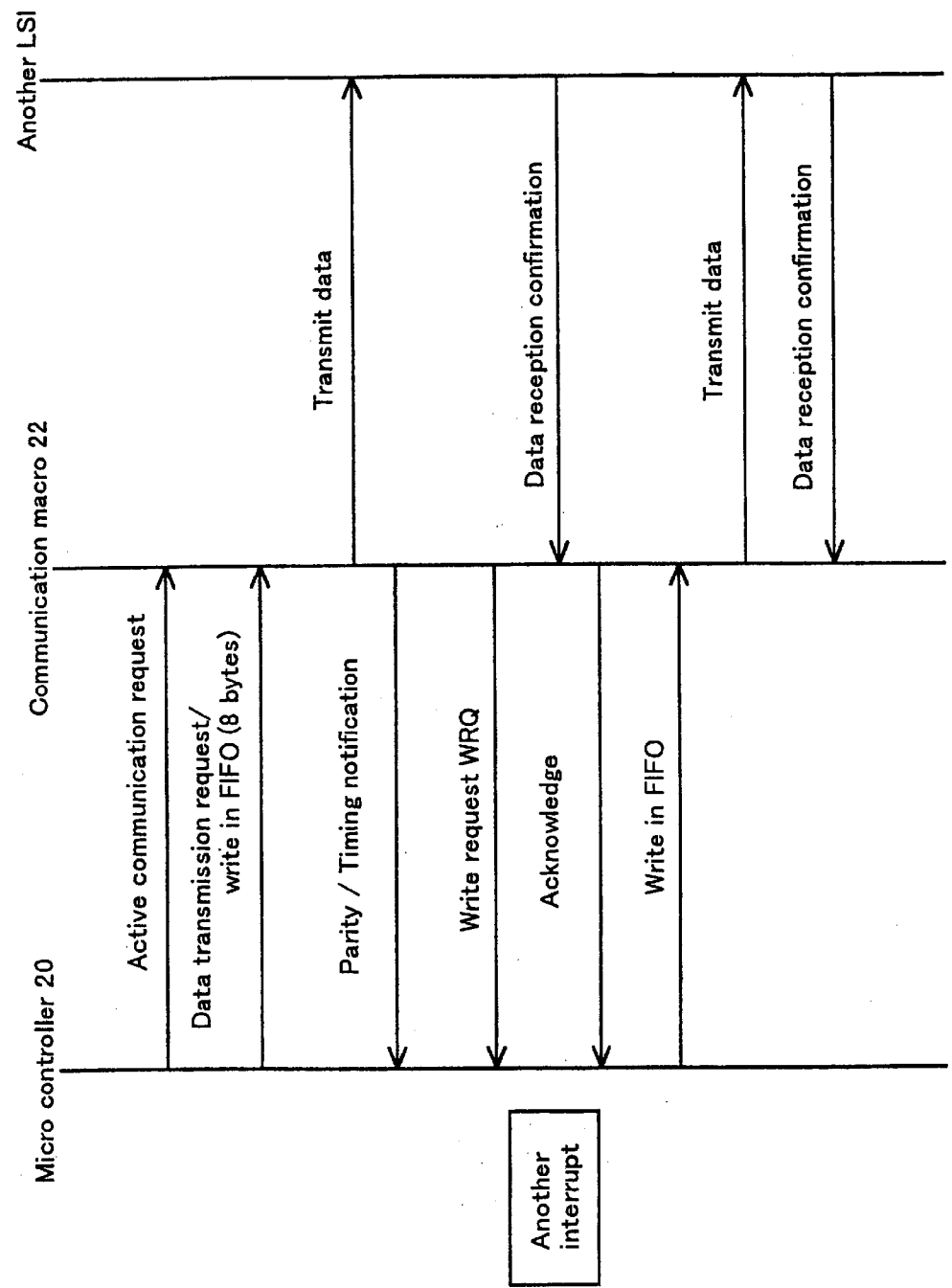
FIG. 9 is a diagram for explaining a case wherein the system LSI transmits data.

In FIG. 9 are shown the transmissions of signals in this embodiment of the present invention when the system LSI transmits data to another system LSI via the communication macro circuit.

The micro-controller 20 of the system LSI outputs an active communication request to the communication macro circuit 22 via the internal bus 21. Upon receiving this request, the communication macro circuit 22 is set to the communication enabled state.

The micro-controller 20 transmits a data transmission request to the communication macro circuit 22, and writes data in the FIFO buffer 34 in the communication macro circuit 22. The storage area of the FIFO buffer 34 is eight bytes, as was previously described.

When eight bytes of data are written in the FIFO buffer 34, the communication macro circuit 22 outputs the written data to another system LSI in the same order as that in which the data were written. During this transmission, the communication macro circuit 22 performs monitoring to determine whether data are being correctly transmitted, and outputs a parity or a timing notification to the micro-controller 20.

In addition, the communication macro circuit 22 outputs to the micro-controller 20 a write request so that the FIFO buffer 34 is not emptied. In this embodiment, since one of the cases 1 to 4 can be selected for the interval at which a write request signal is output, the frequency at which communication errors occur can be reduced.

When the data have been correctly transmitted to another system LSI, that system LSI outputs a data reception confirmation signal to the communication macro circuit 22. When the communication macro circuit 22 receives a data reception confirmation signal, it outputs to the micro-controller 20 an acknowledgment signal as notification that the data were transmitted correctly.

As the data in the FIFO buffer 34 are transmitted, empty area in the FIFO buffer 34 increases. In accordance with the size of the empty area, a write request signal WRQ is output to the micro-controller 20. The micro-controller 20 thereafter determines whether the write request signal WRQ shall be accepted. When the write request signal is accepted, new data are written in the FIFO buffer 34. However, if the write request signal is rejected because there is another interrupt having a higher priority, the data are not written in the FIFO buffer 34 and a communication error may occur.

Figure 10:
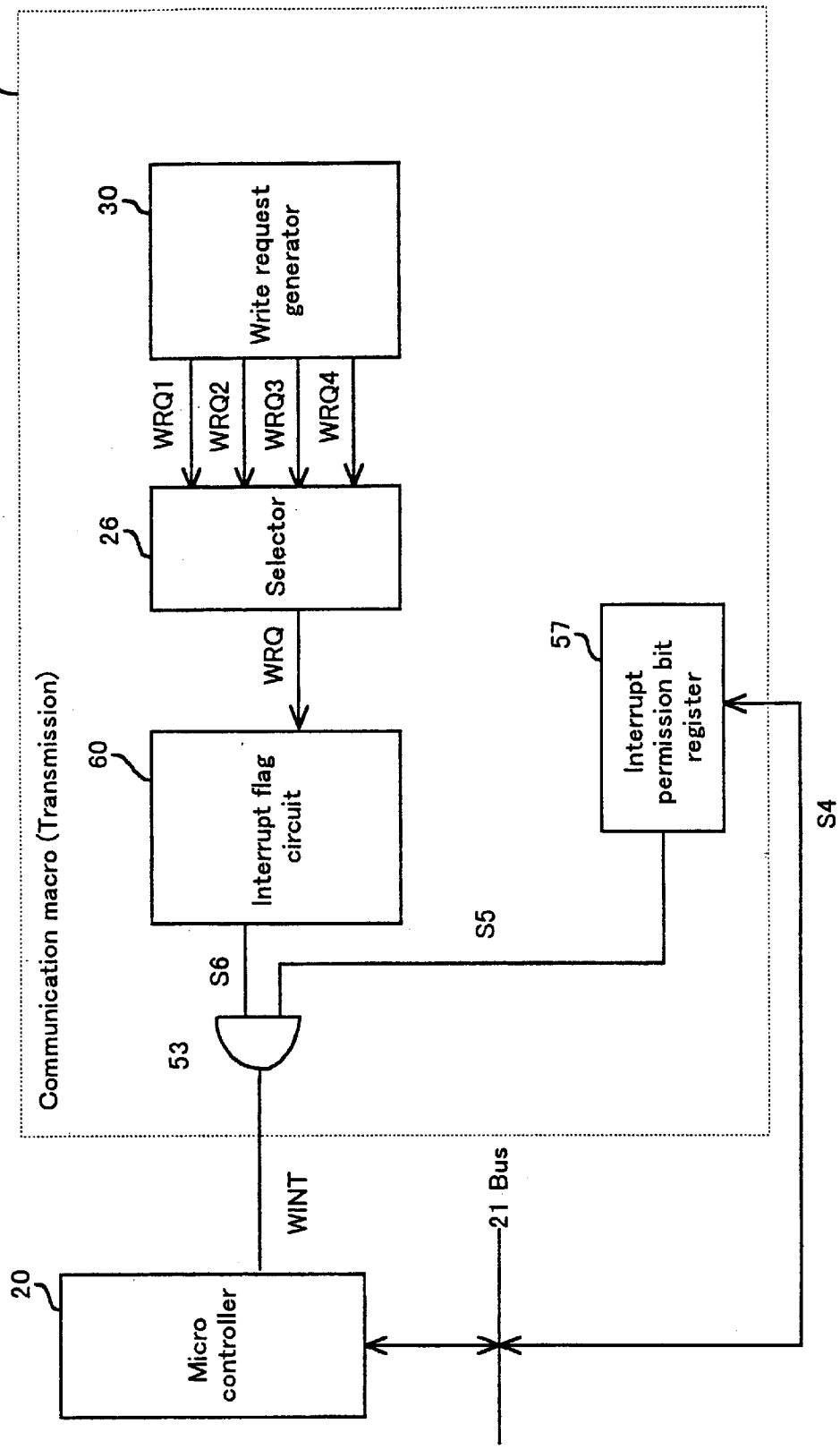
FIG. 10 is a block diagram illustrating a communication macro circuit to which an interrupt flag circuit has been added.

In FIG. 10, an interrupt flag circuit 60, an interrupt permission bit register 57, and an AND circuit 53 are additionally provided for the communication macro circuit 22 in the system LSI in FIG. 3 to perform a transmission in accordance with the embodiment of the present invention.

The write request signal WRQ is transmitted from the selector 26 to the interrupt flag circuit 60. The interrupt flag circuit 60 examines the interrupt flag to determine whether an interrupt can be accepted. If an interrupt can be accepted, a write interrupt signal S6 is output.

The interrupt permission bit register 57 receives an interrupt permission signal S4 from the micro-controller 20 via the internal bus 21, and determines whether an interrupt request should be output for to the write request.

The AND circuit 53 examines an interrupt permission bit signal S5 to determine whether the write interrupt signal S6 should be output. That is, if the interrupt permission bit signal S5 is an enable signal, a write interrupt signal WINT is output then the write request signal S6 is received. If the interrupt permission bit signal S5 is a disable signal, no write interrupt request is output, even when a write request is received. The write interrupt signal WINT, which is passed through the AND circuit, is output to the micro-controller 20.

Figure 11:
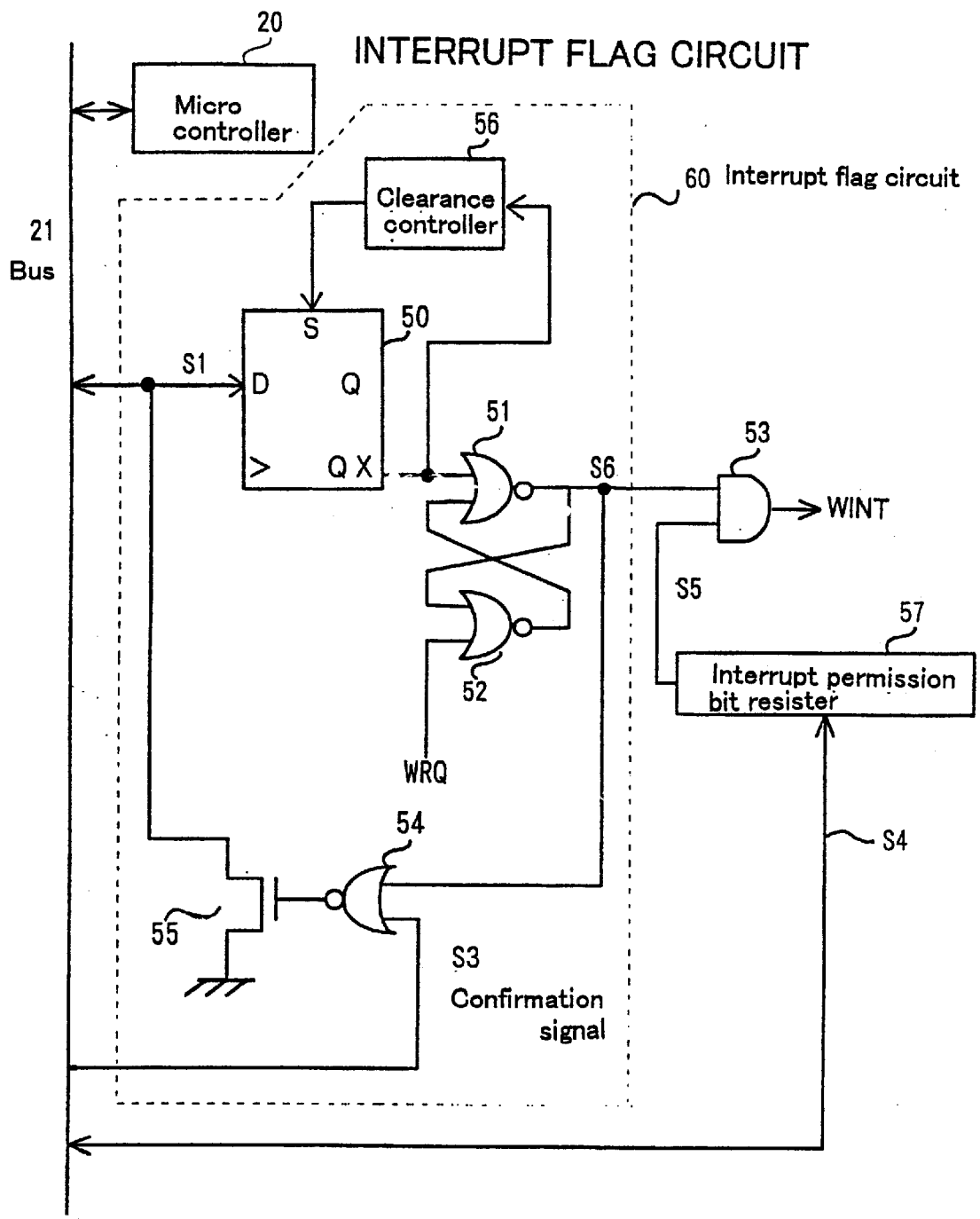
FIG. 11 is a block diagram illustrating the interrupt flag circuit.

FIG. 11 is a block diagram illustrating the interrupt flag circuit 60. An explanation will now be given for the processing performed by the interrupt flag circuit 60 when a confirmation process is performed to determine whether an interrupt can be accepted, and to output the write request signal WRQ as the write interrupt signal WINT.

(1) The micro-controller 20 outputs to the internal bus 21 signal S1=0 as an interrupt flag which indicates that an interrupt has been issued, writes "0" to a flip-flop 50, and sets write inversion output QX to "1." The inverted output QX=1 indicates a condition where output S6 of a latch circuit, constituted by NOR circuits 51 and 52, is set to "0" and no interrupt is issued.

In this condition, after one clock period has elapsed, a clearance control circuit 56 sets the flip-flop 50 so that QX=0. Since the write request signal WRQ is still 0, the output S6 of the latch circuit is maintained at "0," which is the interrupt acceptable state.

(2) When the write request signal WRQ is 1 in the interrupt acceptable state, the output of the NOR circuit 52 is "0" and the output of the NOR circuit 51 is changed from "0" to "1," so that the output S6 of the latch circuit is "1." If the output S5 (interrupt permission bit) of the interrupt permission bit register 57 is "1," a write interrupt signal WINT=1 is output and the micro-controller 20 performs the write interrupt routine.

(3) Following this, the micro-controller 20 confirms that the output S6 of the latch circuit, which is constituted by the NOR circuits 51 and 52, is "1," i.e., that an interrupt has been issued. The micro-controller 20 then outputs confirmation signal S3=0 via the internal bus 21. When the output S6 is "1," the output of the NOR circuit 54 is "0," a transistor 55 is turned off, and a "1" is maintained at the internal bus 21.

When the output S6 of the latch circuit is "0," the output of the NOR circuit 54 is "1," the transistor 55 is turned on, and a "0" is output to the internal bus 21. As a result, the micro-controller 20 can confirm the state of the latch circuit that is constituted by the NOR circuits 51 and 52, i.e., whether the output S6 is 0 or 1.

(4) The micro-controller 20 sets the signal S1 to "0" and clears the flip-flop 50 in order to enable the output of the next write request signal WRQ. Therefore, the inverted output QX is 1 and the output S6 is 0, so that no interrupt is issued. The flip-flop 50 is set after one clock has elapsed, and then enters the same state as in (1).

Figure 12:
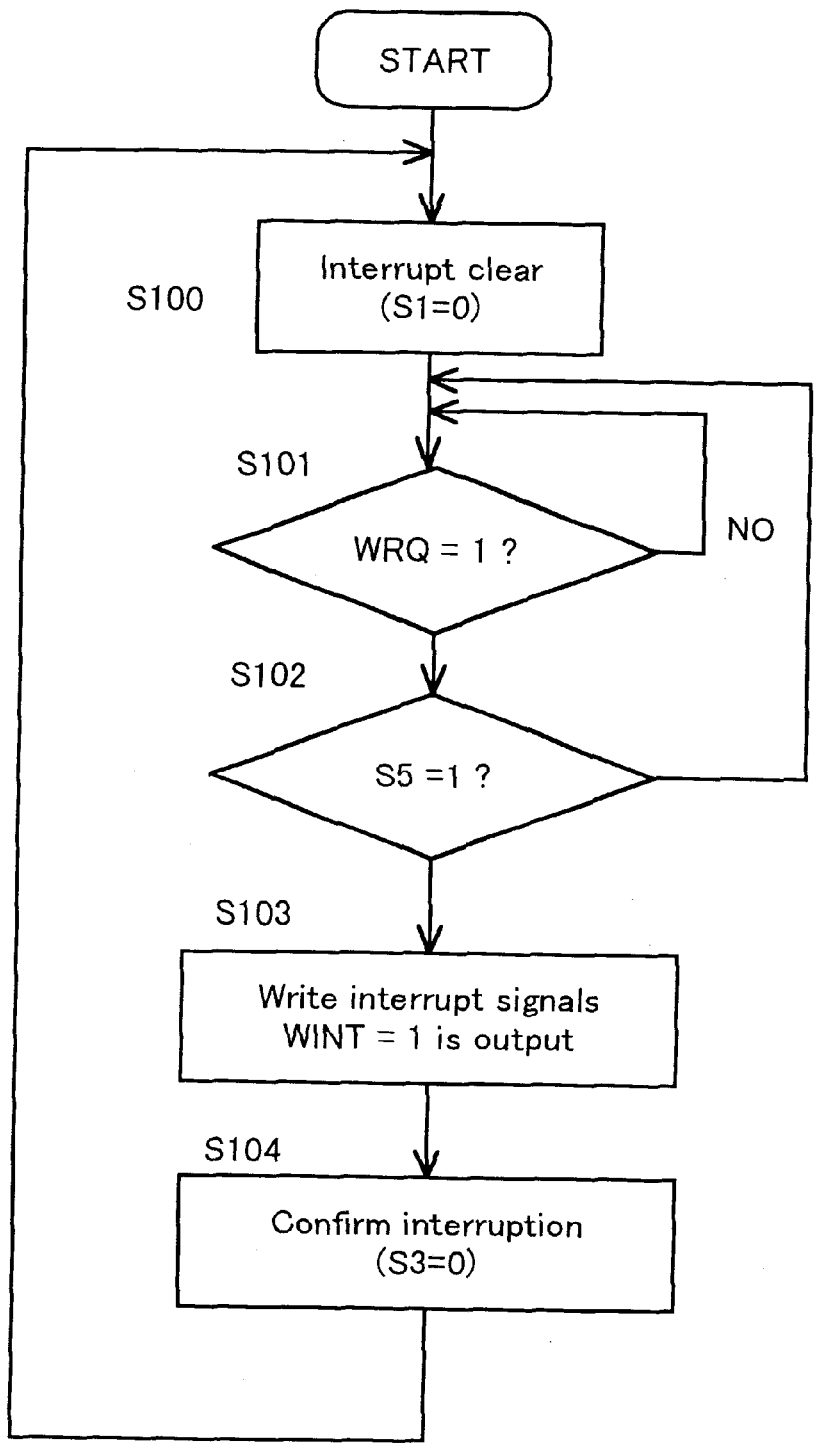
FIG. 12 is a flowchart showing the processing performed by the interrupt flag circuit.

FIG. 12 is a flowchart showing the processing performed by the interrupt flag circuit 60. At step S100 the micro-controller 20 outputs interrupt clear signal S1=0 to the interrupt flag circuit 60, and sets the interrupt flag circuit 60 to the interrupt acceptable state.

At step S101 the program control waits until the write request signal WRQ WRQ is 1. When the write request signal WRQ is 1, program control moves to step S102. At step S102 when the interrupt permission bit S5 is 0, the write interrupt signal WINT is not output.

When the interrupt permission bit is 1, at step S103 the write interrupt signal WINT=1 is transmitted to the micro-controller 20. At step S104 the micro-controller 20 sets the interrupt confirmation signal S3 to 0, and confirms that the interrupt has been issued. After that confirmation, program control returns to step S100 and the same processing is repeated.

Therefore, in the communication macro circuit in this embodiment, the micro-controller 20 controls the interrupt permission bit register 57 so as to determine whether the write interrupt signal WINT should be output.

As is described above, according to the first embodiment of the present invention, the timing at which data to be transmitted are written in the FIFO buffer used for transmission can be set to the optimal interval for the system a user employs.

Therefore, a condition where a communication error occurs can be prevented in advance, and the frequency of the retransmission of data due to communication errors can be reduced. In addition, the load imposed on software can be reduced and the efficiency of the system control can be considerably increased.

[Second Embodiment]

Figure 13:
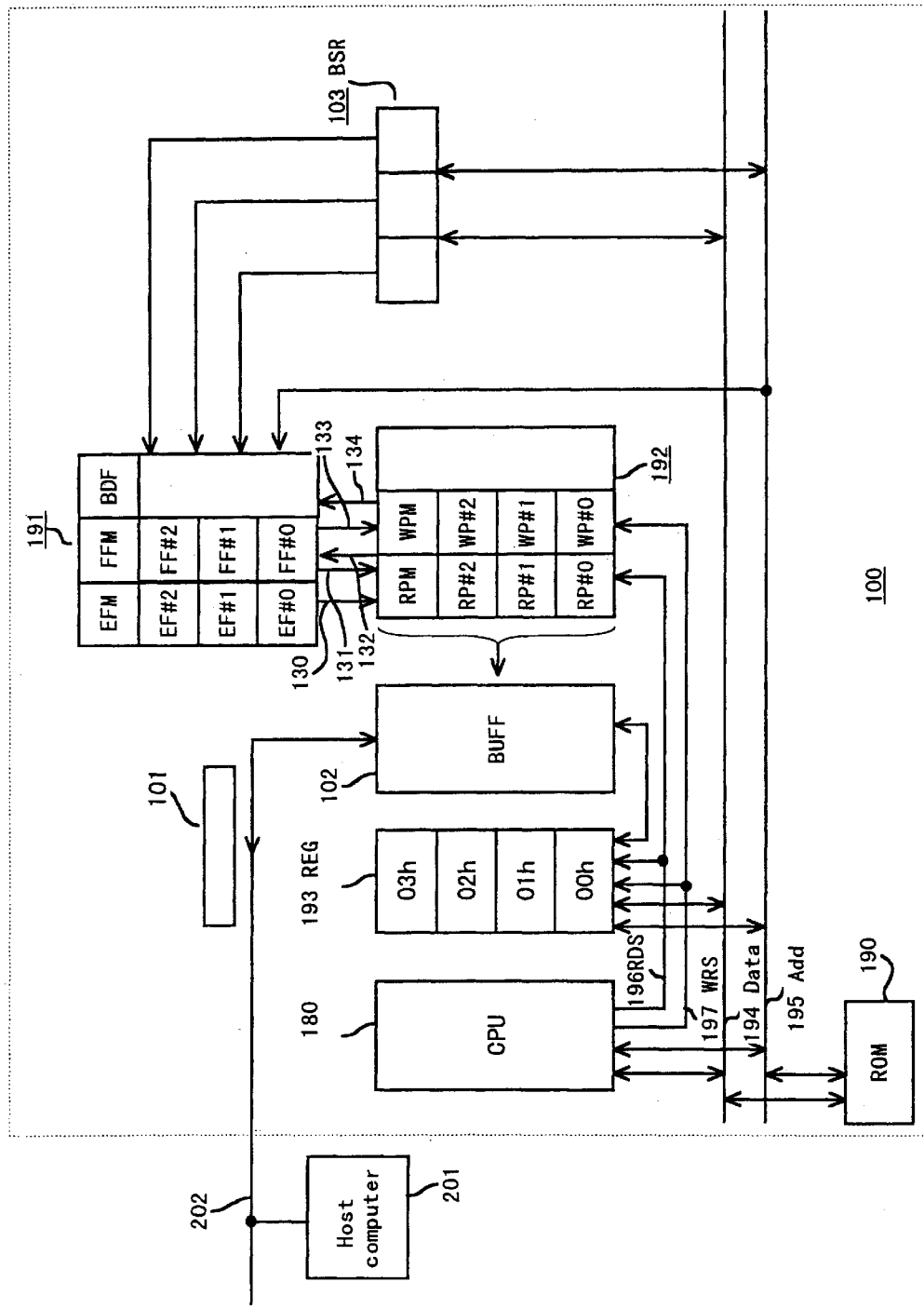
FIG. 13 is a block diagram illustrating an integrated circuit device according to the embodiment of the present invention.

FIG. 13 is a block diagram illustrating an integrated circuit device according to a second embodiment of the present invention. The integrated circuit device 100 comprises: a buffer 102, used for exchanging data with a host computer 201 via a communication line 202; an address setup unit 192, for setting a data writing address or a data reading address for the buffer 102; an address setup controller 191, for setting a pointer value and a flag for the address setup unit 192; a register 193, which is a data writing/reading unit related to the buffer 102; a size setup unit 103, for setting the number of bytes by which the buffer 102 is to be divided according to a communication protocol; a ROM 190, for the storage of a communication protocol control program; and a CPU 180.

The buffer 102 can be logically divided in accordance with a plurality of communication formats. Therefore, read pointers RP#0 to RP#2 and write pointers WP#0 to WP#2 are respectively provided for the address setup unit 192 for sub-buffers obtained by division. When the buffer 102 is not divided, read pointer RPM and write pointer WPM in the address setup unit 192 are employed.

The address setup controller 191 sets the pointer value for the address setup unit 192. Empty flags EF#0 to EF#2 and full flags FF#0 to FF#2 are included in the address setup controller 191, which correspond to the sub-buffers obtained by dividing the buffer 102. When the buffer 102 is not divided, empty flag EFM and full flag FFM are employed. Buffer division flag BDF indicates whether or not the buffer 102 is divided.

Addresses 00H to 03H are assigned for the register 193 which is used to write and read data in the buffer 102. The addresses 00H to 02H in the register 193 are used as write/read registers for the individual sub-buffers, and address 03H is used when the buffer 102 is not divided.

The CPU 180 is connected to the register 193, etc., by a data bus 194 and an address bus 195. The CPU 180 transmits a write strobe signal 197 or a read strobe signal 196 to the register 193 and the address setup unit 192, and writes transmission data recorded in the register 193 to the buffer 102, or reads data entered in the buffer 102 to the register 193.

To read received data from the buffer 102 or to write transmitting data to the buffer 102, the address setup controller 191 transmits, to the address setup unit 192, a read/write pointer selection signal 130 and pointer value setup signals 131 and 133. The address setup unit 192 transmits, to the address setup controller 191, an empty flag setup signal 132 and a full flag setup signal 134.

An explanation will now be given for the sequential processes performed by the individual sections of the integrated circuit device 100 when data are received from the host computer 201.

(1) First, in accordance with the format stored in the ROM 190, the CPU 180 writes to the size setup unit 103 byte counts a, b and c, which indicate the sizes of the sub-buffers obtained by logically dividing the buffer 102. When the integrated circuit device 100 receives data, the address setup controller 191 sets a buffer division flag BDF to "0" to indicate that buffer 102 is not to be divided.

(2) Then, the address setup controller 191 sets an initial value of "0" for the read pointer RPM and the write pointer WPM 192, in the address setup unit 192, which are used for the non-divided buffer 102. The address setup controller 191 also sets depth "a+b+c" for a predetermined area. It should be noted that the depth "a+b+c" indicates the total number of bytes of received data.

(3) When the initial value "0" is set for the write pointer WPM, data are received and written in the buffer 102 at an address indicated by the pointer value. Each time data are written, the value held by the write pointer WPM is incremented.

(4) When the value held by the write pointer WPM is incremented and the difference in the values held by the write pointer and the read pointer RPM is equal to the depth "a+b+c," i.e., when $$WPM-RPM=a+b+c,$$

the full flag FFM in the address setup controller 191, which is used for the non-divided buffer 102, is set to "1." This setting of the full flag FFM to "1" is performed when the full flag setup signal 134 is generated by the address setup unit 192 using the above calculation.

(5) When the full flag FFM is set to "1," the address setup controller 191 sets the read pointers RP#0 to RP#2 in the address setup unit 192 to initial values of "0," "a" and "a+b," and also sets the writes pointers WP#0 to WP#2 to values "a," "a+b" and "a+b+c," which correspond to the sizes (depths) a, b and c of the sub-buffers. These values are then validated. The depths "a," "b" and "c" each constitute the number of bytes of received data according to the communication format. As a result, the buffer 102 is logically divided. In addition, in accordance with the non-inverted logic of the full flag FFM="1," the buffer division flag BDF is set to "1," and the read pointers and write pointers for the sub-buffers are validated.

(6) When the buffer 102 is logically divided, the CPU 180 issues a 00H address reading command to the register 193. In response to this command, data are read from the buffer 102 by using as an address the value of the read pointer RP#0, and are written at address OOH in the register 193. Thereafter, the value held by the read pointer RP#0 is incremented.

(7) When reading the received data have been completed for address 00H in the register 193, and when the value held by the read pointer RP#0 is equal to that held by the write pointer WP#0, i.e., when $$RP\#0=WP\#0=a,$$

the empty flag EF#0 in the address setup controller 191 is set to "1." The setting of the empty flag EF#0 to "1" is performed when the empty flag setup signal 132 is generated by the address setup unit 192 using the above calculation.

(8) Processes (6) and (7) are performed for address 01H of the register 193 in order to read the received data from the succeeding sub-buffer.

(9) Processes (6) and (7) are performed for address 02H of the register 193 in order to read the received data from the further succeeding sub-buffer.

(10) When all the empty flags EF#0 to EF#2 have been set to "1," the address setup controller 191 sets the buffer division flag BDF to "0," in accordance with the NAND logic for these empty flags, and changes the buffer 102 into undivided condition. Therefore, the succeeding data can be written in the buffer 102.

An explanation will now be given for the processing performed when the integrated circuit device 100 transmits data to the host computer 201. The order in which data are transmitted is the reverse of that in which the data are received. First, the transmitting data are written in the sub-buffers, and after the writing has been completed, the sub-buffers are converted into a single undivided buffer, from which the data are then transmitted.

More specifically, before the transmitting data are written in sub-buffers, the size setup unit 103 is set to a, b and c, which represent the sizes of the sub-buffers, in accordance with the transmission format. The buffer 102 is logically divided to provide three sub-buffers, in accordance with the setup stored in the size setup unit 103.

When the transmitting data are written in the three sub-buffers obtained by logical division, the address setup controller 191 resets the buffer division flag BDF, and the three sub-buffers are rearranged to provide the single, undivided buffer 102.

Since the data which correspond to the sizes of the size setup unit 103 have been stored in the sub-buffers, a data string 101 conforming to a transmission format defined in the communication protocol can be read from the undivided buffer 102 and transmitted.

FIGS. 14 to 16 are explanatory diagrams (I) to (III) for the reception of data at the integrated circuit device according to this embodiment of the present invention. The state of the buffer 102 during data reception will now be described while referring to FIGS. 14 to 16.

Figure 14A:
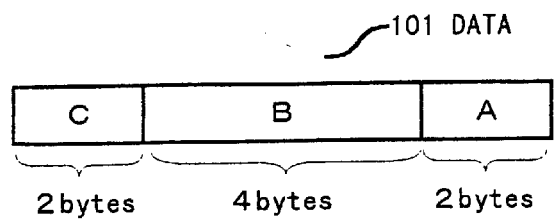
FIGS. 14A to 14C are explanatory diagrams (I) for the reception of data (writing) according to the embodiment of the present invention.

In FIG. 14A is shown the data string 101 for a reception format defined by the communication protocol. The data string is received via the communication line 202 in the order data A, consisting of two bytes; data B, consisting of four bytes; and data C, consisting of two bytes.

Figure 14B:
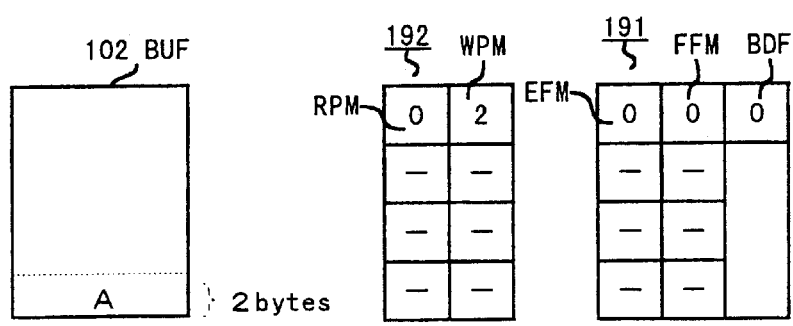

In FIG. 14B are shown the states of the buffer 102, the address setup unit 192, and the address setup control unit 191 when data A, consisting of two bytes, is received at the head of the data string. In this case, the write pointer WPM in the address setup unit 192 is set to "2," indicating that two bytes data A are written in the buffer 102. Since data have not yet been read, the read pointer RPM in the address setup unit 192 is maintained at the initial value "0."

The empty flag EFM in the address setup controller 191 is "0" because the data are present in the buffer 102 and WPM≠RPM. The full flag FFM is "0" because not all the data are written in the data buffer 102 and WPM−RPM=2<8. And the buffer division flag BDF is also "0," which indicates that the buffer 102 is being operated as a single, undivided buffer.

Figure 14C:
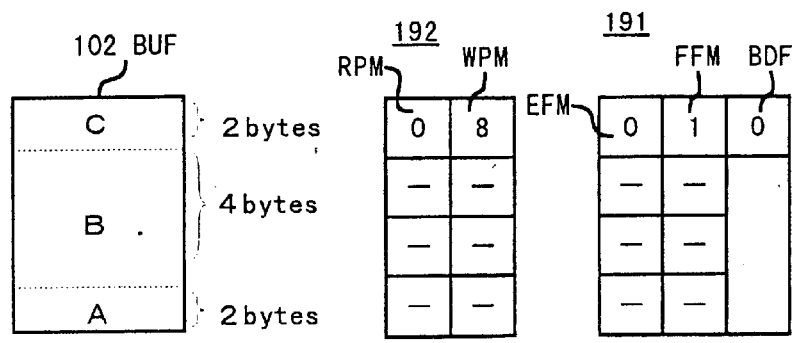

In FIG. 14C are shown the states of the buffer 102, etc., when the data string 101 has been received. In this case, the write pointer WPM in the address setup unit 192 is "8," which indicates that all the data A, B and C, consisting of eight bytes for the data string 101, have been written in the buffer 102. That is, WPM−RPM=8 is established, and in response to the full flag signal 134, the full flag FFM in the address setup controller 191 is set to "1," which indicates that the data have been written in the buffer 102. Then, in accordance with the non-inverted logic for the full flag FFM="1," the buffer division flag BDF is set to "1" and the buffer is then divided.

Figure 15A:
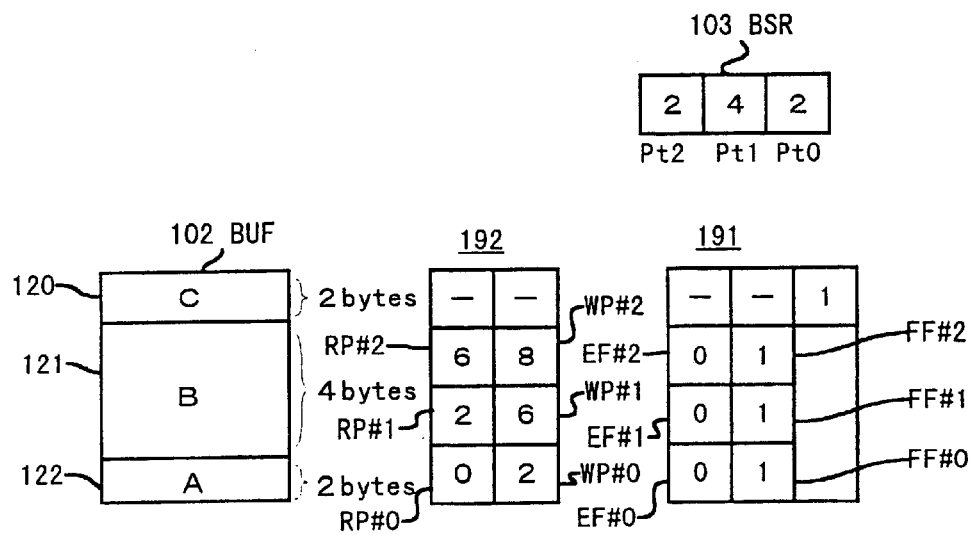
FIGS. 15A to 15B are explanatory diagrams (II) for the reception of data (reading) according to the embodiment of the present invention.

In FIG. 15A is shown the state of the buffer 102 following its division in accordance with the data in the size setup unit 103, and the states of the other components. The size setup unit 103 is set in advance in accordance with the transmission format of the received data string 101, so that Pt0="2," Pt1="4" and Pt2="2.". It should be noted that the CPU 180 sets the size setup unit 103 in accordance with a transmission protocol program stored in the ROM 190.

When the data string 101 has been entered in the buffer 102 and the buffer division flag BDF has been set to "1," the buffer 102 is logically divided into sub-buffers 120, 121 and 122, the sizes of which are designated by the size setup unit 103.

Specifically, initial values "0," "2" and "6," which represent the first addresses of the individual sub-buffers, are set in the address setup unit 192 for read pointers RP#0, RP#1 and RP#2, while values "2," "6" and "8," which represent the ends of the addresses corresponding to the sizes of the individual sub-buffers, are set for write pointers WP#0, WP#1 and WP#2. These pointers are then validated.

In addition, since all the data are written in the buffer 102 and WP is not equal to RP, a "0" is set for each of the empty flags EF#0, EF#1 and EF#2 in the address setup controller 191. In addition, since WP−RP=sub-buffer size, a "1" is set for each of the full flags FF#0, FF#1 and FF#2. When the read pointers RP, the write pointers WP and the sub-buffer sizes are designated, these empty flags and full flags are automatically set by the full flag setup signal 134 and the empty flag setup signal 132, the two of which are generated by the address setup unit 192.

Figure 15B:
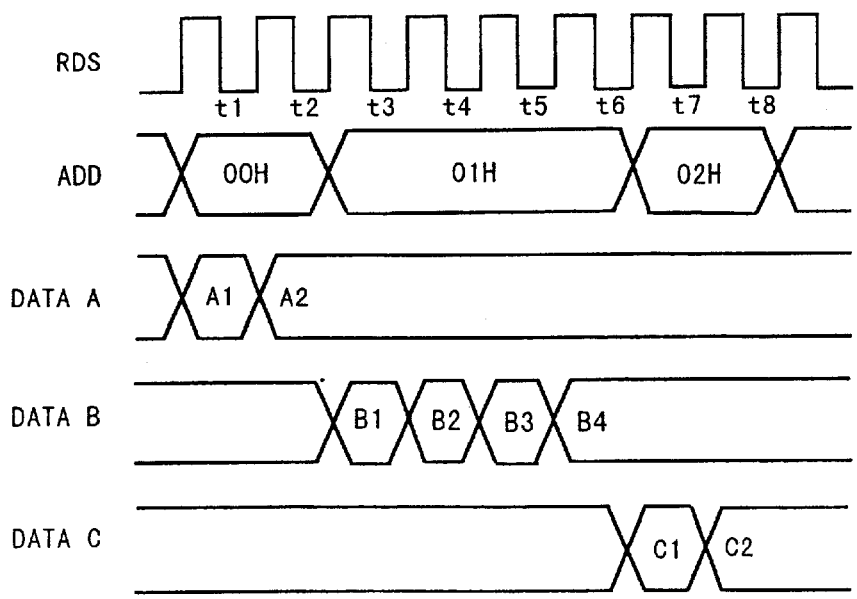

FIG. 15B is a time chart for reading data from the buffer 102. The CPU 180 in the integrated circuit device 100 outputs a read strobe signal RDS and an address signal ADD, and reads the received data from the sub-buffers 122, 121 and 120. In this case, as was previously described, addresses 00H, 01H and 02H in the register 193 are assigned for the sub-buffers 122, 121 and 120.

As is shown in FIG. 15B, at times t1 and t2 data A1 and A2, a total of two bytes, are respectively read from the sub-buffer 122, and at times t3 to t6, data B1, B2, B3 and B4, a total of four bytes, are read from the sub-buffer 121. Then, at times t7 and t8 data C1 and C2, a total of two bytes, are read from the sub-buffer 120. In FIG. 15B the sub-buffers 122, 121 and 120 are sequentially accessed in the named order; however, by changing the address signal ADD an arbitrary order may be used for the one by one accessing of the individual sub-buffers.

Figure 16A:
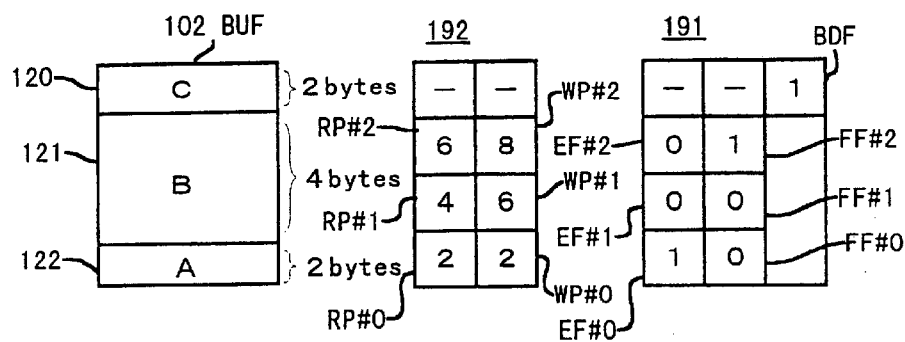
FIGS. 16A to 16C are explanatory diagrams (III) for the reception of data (reading) according to the embodiment of the present invention.

In FIG. 16A are shown the states of the buffer 102, the address setup unit 192, and the address setup controller 191 at time t4. At time t4, the reading of data A from the sub-buffer 122 is already completed, and the read pointer RP#0 in the address setup unit 192 is set to "2." Since RP#0=WP#0=2, the empty flag EF#0 in the address setup controller 191 is set to "1." It should be noted that as a consequence of the reading of data A, the full flag FF#0 is reset to "0."

At time t4, as is shown in FIG. 15B, the reading of data from the sub-buffer 121 up to data B2 has been completed, and the read pointer RP#1 in the address setup unit 192 is set to "4." Since RP#1 is not equal to WP#1, the empty flag EF#1 is maintained at "0." Further, since data B is in the process of reading, the full flag FF#1 in the address setup controller 191 is still "1".

Figure 16B:
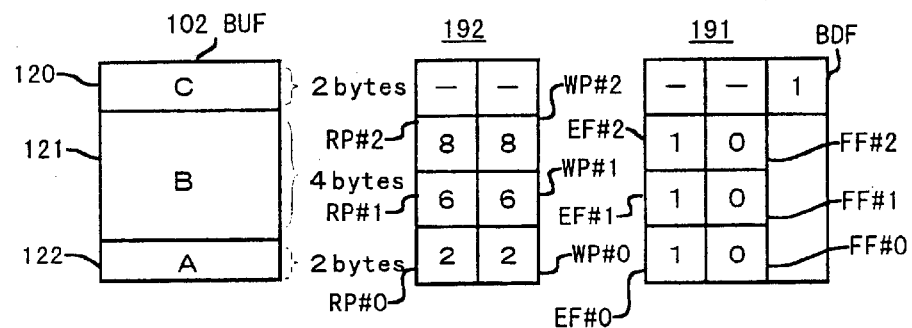

In FIG. 16B are shown the states of the buffer 102, the address setup unit 192, and the address setup controller 191. At time t8 all the data in the sub-buffers 122, 121 and 120 have been read, and read pointers RP#0, RP#1 and RP#2 in the address setup unit 192 are respectively set to "2," "6" and "8," and are equal to the values held by the of write pointers WP#0, WP#1 and WP#2. Therefore, in the address setup controller 191 empty flags EF#0, EF#1 and EF#2 are all set to "1." Full flags FF#0, FF#1 and FF#2 were previously reset to "0."

Figure 16C:
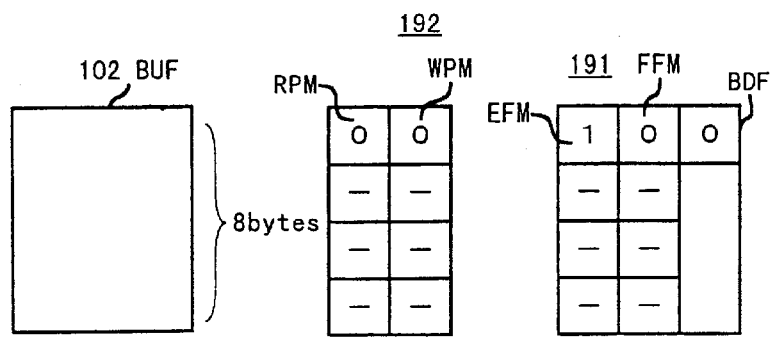

In FIG. 16C are shown the states of the buffer 102, the address setup unit 192, and the address setup controller 191 at the termination of reading the data. When, at time t8, in the address setup controller 191 the empty flags EF#0, EF#1 and EF#2 are all set to "1," the buffer division flag BDF is reset to "0," in accordance with the NAND logic for the flags, and the undivided buffer read and write pointers RPM and WPM are validated, the eight-byte buffer 102 is returned to its single, undivided state. In addition, to enter the standby state and to receive additional data, the read pointer RPM and the write pointer WPM are set to "0," while the buffer size=8. When WPM=RPM, the undivided buffer empty flag EFM is set to "1," and when WMP−RPM<8, the full flag FFM is reset to "0."

As is described above, the buffer 102 of the integrated circuit device according to this embodiment can serve as a single, undivided buffer for the storage of data which are received, and for the independent reading of received data, can also serve as a number of sub-buffers having sizes which correspond to the reception format. Therefore, a transmission/reception buffer can be provided which has a flexible structure and which can be modified to conform with a variety of different data formats.

FIGS. 17 to 19 are explanatory diagrams (I) to (III) for the data transmission which is performed by the integrated circuit device 100 in this embodiment. While referring to FIGS. 17 to 19, an explanation will now be given for the states of the buffer 102, the address setup unit 192, and the address setup controller 191 during the transmission of data.

Figure 17A:
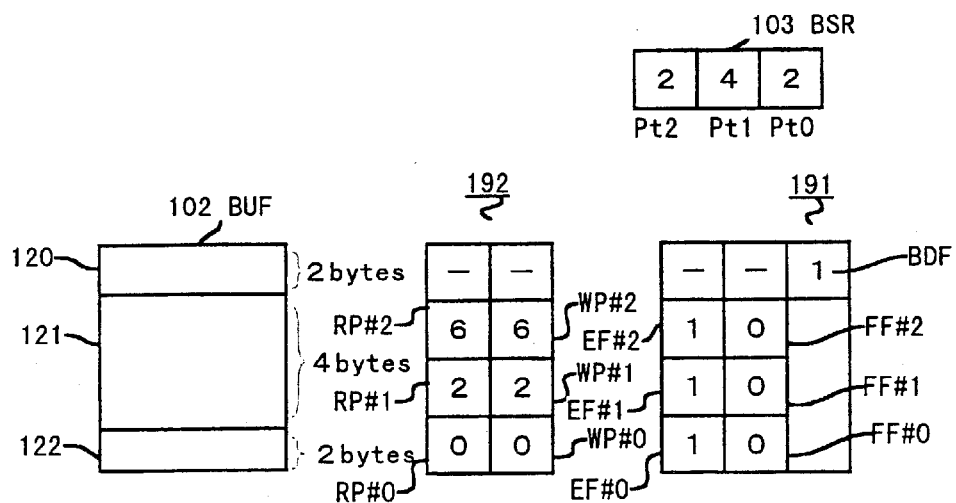
FIGS. 17A to 17B are explanatory diagrams (I) for the transmission of data (writing) according to the embodiment of the present invention.

In FIG. 17A are shown the states of the buffer 102 before the transmitting data are written therein, the address setup unit 192, the address setup controller 191, and the size setup unit 103. The size setup unit 103, in accordance with the transmission format, is set in advance, with Pt0="2," Pt1= "4," and Pt2="2."

When the integrated circuit device 100 of the embodiment has transmitted the preceding data, the buffer division flag BDF in the address setup controller 191 is set to "1," and the buffer 102 is logically divided into three sub-buffers 120, 121 and 122 in accordance with the settings in the size setup unit 103.

In this case, initial values "0," "2" and "6," which represent the first addresses of the individual sub-buffers, are set in the sub-buffer write pointers WP#0, WP#1 and WP#2 in the address setup unit 192, and also to sub-buffer read pointers RP#0, RP#1 and RP#2. Then, these pointers are validated. In addition, the sizes of the sub-buffers, "2," "4" and "6," are set in a predetermined areas (not shown). At this time, since no data have as yet been written in the buffer 102, and RP=WP, the empty flags EF#0, EF#1 and EF#2 in the address setup controller 191 are all set to "1" in accordance with the empty flag setup signal 132. Further, since WP−RP =0<2, 4, 2, the full flags FF#0, FF#1 and FF#2 are all reset to "0" in accordance with the full flag setup signal 134.

Figure 17B:
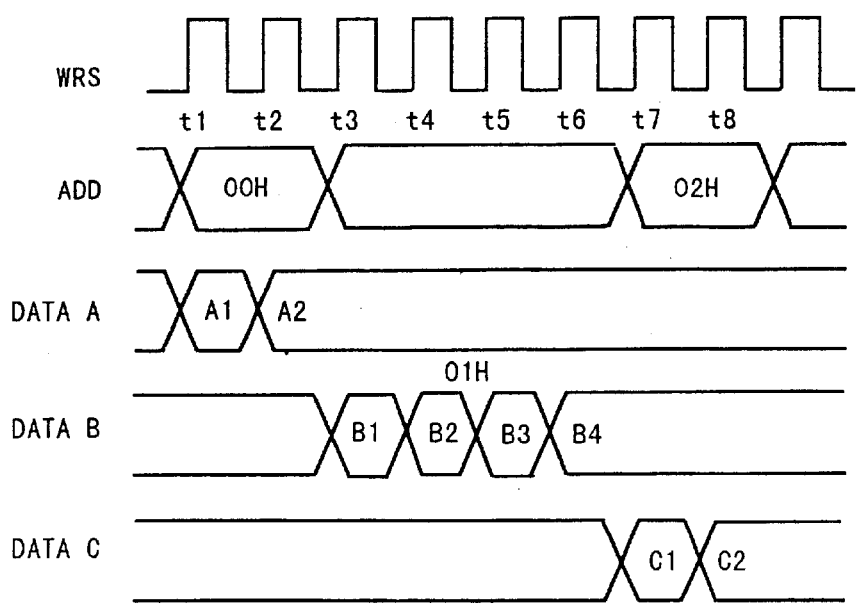

FIG. 17B is a time chart for writing data in the buffer 102. The CPU 180 of the integrated circuit device 100 outputs a write strobe signal WRS and an address signal ADD for the writing of transmission data in the sub-buffers. Addresses 00H, 01H and 02H in the register 193 are assigned for the su-buffers 122, 121 and 120.

As is shown in FIG. 17B, at times t1 and t2 data A1 and A2 are written in the sub-buffer 122, at times t3 to t6 data B1, B2, B3 and B4 are written in the sub-buffer 121, and at times t7 and t8 data C1 and C2 are written in the sub-buffer 120. In FIG. 17B is shown an example where data are sequentially written in the named order in the sub-buffers 122, 121 and 120. However, by changing the address signal ADD, an arbitrary order may be used for the one by one writing of data in the individual sub-buffers.

Figure 18A:
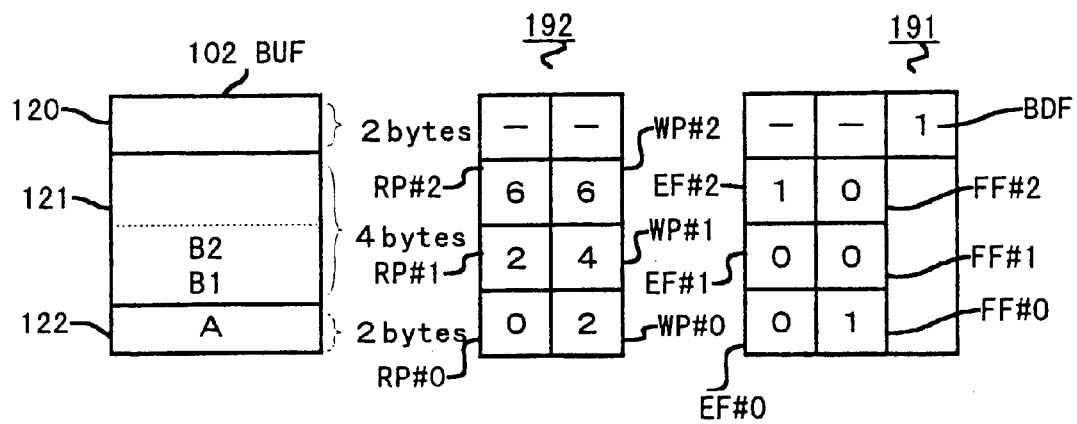
FIGS. 18A to 18B are explanatory diagrams (II) for the transmission of data (writing) according to the embodiment of the present invention.

In FIG. 18A are shown the states of the buffer 102, the address setup unit 192 and the address setup controller 191 at time t4. At time t4 the writing of data A to the sub-buffer 122 is already completed, the sub-buffer write pointer WP#0 in the address setup unit 192 is set to "2," and WP#0−RP#0=2. As a result, sub-buffer full flag FF#0 in the address setup controller 191 is set to "1." Further, since data A have been written, WP#0 is not equal to RP#0, and the sub-buffer empty flag EF#0 is reset to "0." When data A have been written in the sub-buffer 122 and the sub-buffer full flag FF#0 has been set to "1," the address setup controller 191 validates sub-buffer write pointer WP#1 and read pointer RP#1.

Then, at time t4 the writing in the sub-buffer 121 is completed up to data B2. Since sub-buffer write pointer WP#1 in the address setup unit 192 is set to "4," and WP#1−RP#1=2<4, sub-buffer full flag FF#1 is maintained at "0." However, since data B1 and B2 have been written, WP#1 is not equal to RP#1, and in the address setup controller 191 the sub-buffer empty flag EF#1 is reset to "0."

Figure 18B:
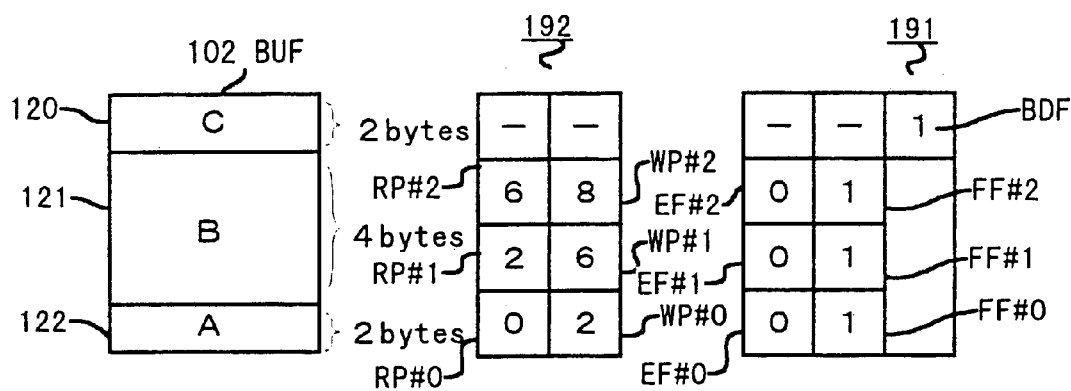

In FIG. 18B are shown the states of the buffer 102, the address setup unit 192, and the address setup controller 191. At time t8 all the data have been written to the sub-buffers 122, 121 and 120, and in the address setup unit 192, the write pointers WP#0, WP#1 and WP#2 have respectively been set to "2," "6" and "8," so that the differences between these values and those held by the read pointers RP#0, RP#2 and RP#2 equal the sizes of the individual sub-buffers. Therefore, in the address setup controller 191 the sub-buffer full flags FF#0, FF#1 and FF#2 are all set to "1." And when the read pointers RP do not equal the write pointers WP, the empty flags EF#0, EF#1 and EF#2 are all reset to "0."

Figure 19A:
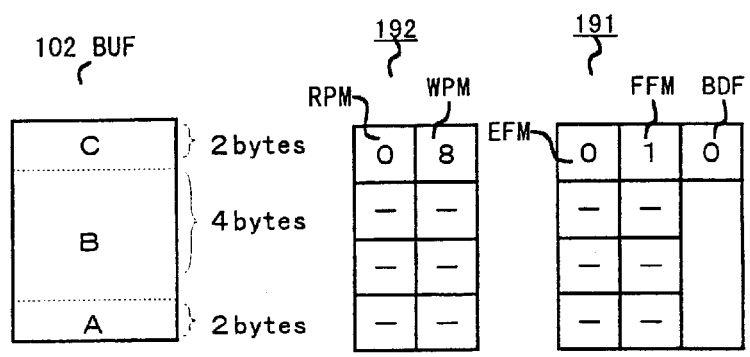
FIGS. 19A to 19C are explanatory diagrams (III) for the transmission of data (reading) according to the embodiment of the present invention.

In FIG. 19A are shown the states of the buffer 102, the address setup unit 192, and the address setup controller 191 after the writing of data has been terminated. When, at time t8, in the address setup controller 191 all the full flags FF#0, FF#1 and FF#2 are set to "1," the buffer division flag BDF is reset to "0" in accordance with the NAND logic for the flags, and the undivided buffer read and write pointers RPM and WPM are validated, the eight-byte buffer 102 is returned to its single, undivided state. In addition, the address setup controller 191 sets the write pointer WPM to "8," and the read pointer RPM is set to the initial value "0," so that the standby state is setup for the transmission of data. Since data from the buffer 102 have not yet been transmitted, and since WPM is not equal to RPM, in the address setup controller 191 the undivided buffer empty flag EFM is reset to "0."Further, since WMP−RPM=8, the full flag FFM is set to "1."

Figure 19B:
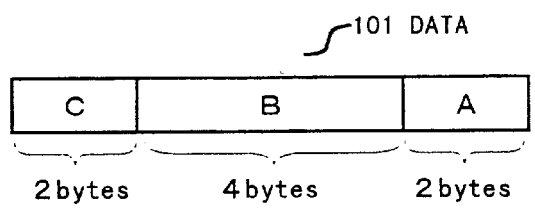

In FIG. 19B is shown a data string 101 which has a transmission format specified by the communication protocol. The data string 101 is read from the buffer 102 and transmitted in the order data A1, consisting of two bytes, data B, consisting of four bytes, and data C, consisting of two bytes. Each time one byte of data is transmitted, the read pointer RPM is incremented.

Figure 19C:
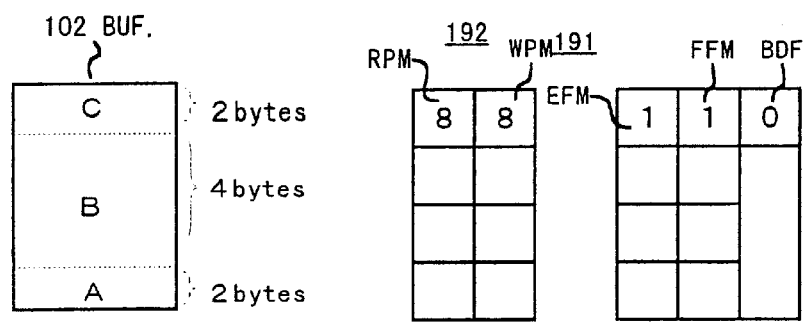

In FIG. 19C are shown the states of the buffer 102 when the transmission of data has been completed. In the address setup unit 192 the undivided buffer read pointer RPM is set to "8," which indicates that all eight bytes of the data A, B and C have been read from the buffer 102. Since RPM= WPM=8, the empty flag setup signal 132 is generated, and in the address setup controller 191 the undivided buffer empty flag EFM is set to "1," indicating that all the data in the buffer 102 have been transmitted.

As is described above, during the transmission of data the buffer 102 of the integrated circuit device in this embodiment can serve as a single, undivided buffer, and for the writing of transmission data, the buffer 102 can be divided according to the size setup unit 103 into sizes corresponding to those established by the transmission format. Therefore, the buffer can be used by dividing it into sub-buffers as required for different data formats, so that a flexibly structured transmission/reception buffer can be provided. As a result, the CPU 180 need only set the size setup unit 103, and the buffer 102 can be divided into arbitrarily sized sub-buffers which correspond to the format used for the data which are to be transmitted by using a simple hardware arrangement.

In the above description, for the transmission or the reception of data, the eight-byte buffer 102 is divided into three sub-buffers in accordance with the configuration established by the communication format. However, the buffer 102 can also be divided into only two sub-buffers.

Specifically, the buffer 102 in the integrated circuit device 100 in this embodiment has a fixed number of sub-divisions. However, if for the address setup unit 192 and the address setup controller 191 there are provided read pointers, write pointers, empty flags and full flags for which the individual counts are the equivalents of the maximum division count Md for the communication format, and if the count of the size setup units 103 is also provided to be the equivalent of the maximum division count Md, the buffer can be divided by a number which is equal to or smaller than the maximum division count Md.

In this case, employed are the read pointers, the write pointers, the empty flags and the full flags whose number are equal to or smaller than the maximum division count Md, which corresponds to the communication format, and the initial values and the depths (the sub-buffer sizes) of the read pointers and the write pointers are set in accordance with the communication format. When the division of the buffer 102 is controlled in accordance with the values of the empty flags and the full flags, a communication format can be handled whose number of data is equal to or smaller than the maximum division count Md.

Figure 20:
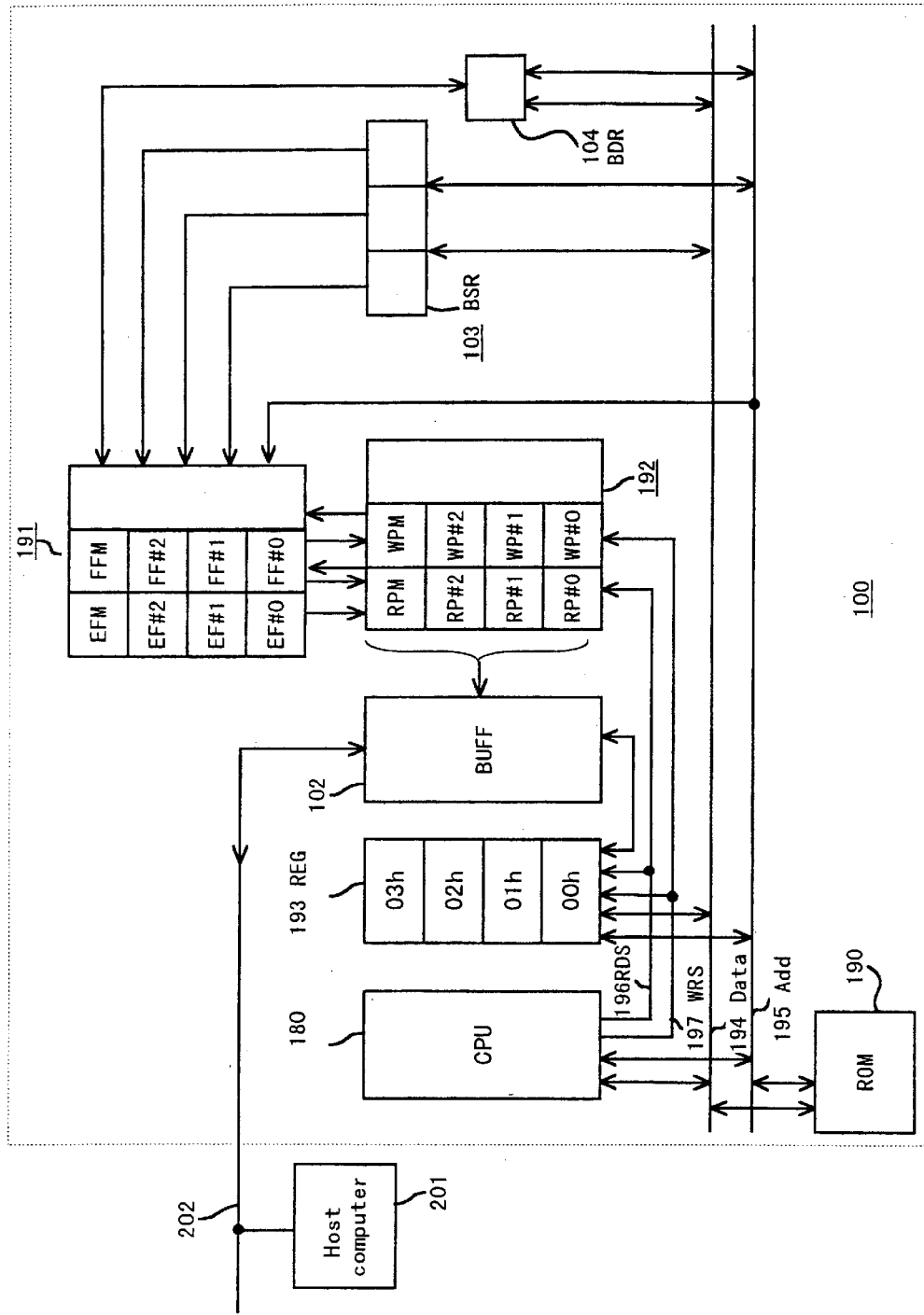
FIG. 20 is a block diagram illustrating an integrated circuit device according to another embodiment of the present invention.
Figure 21A:
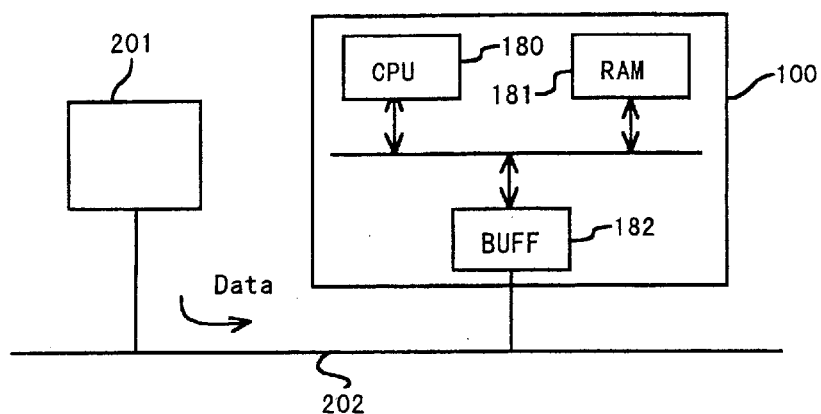
FIGS. 21A to 21C are explanatory diagrams (I) for conventional data communication.
Figure 21B:
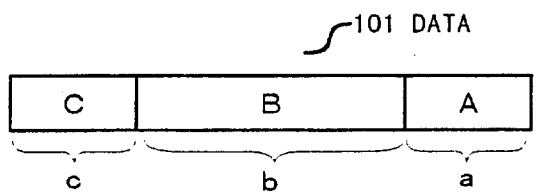
Figure 21C:
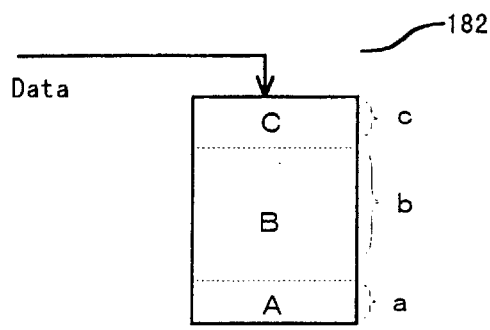
Figure 22:
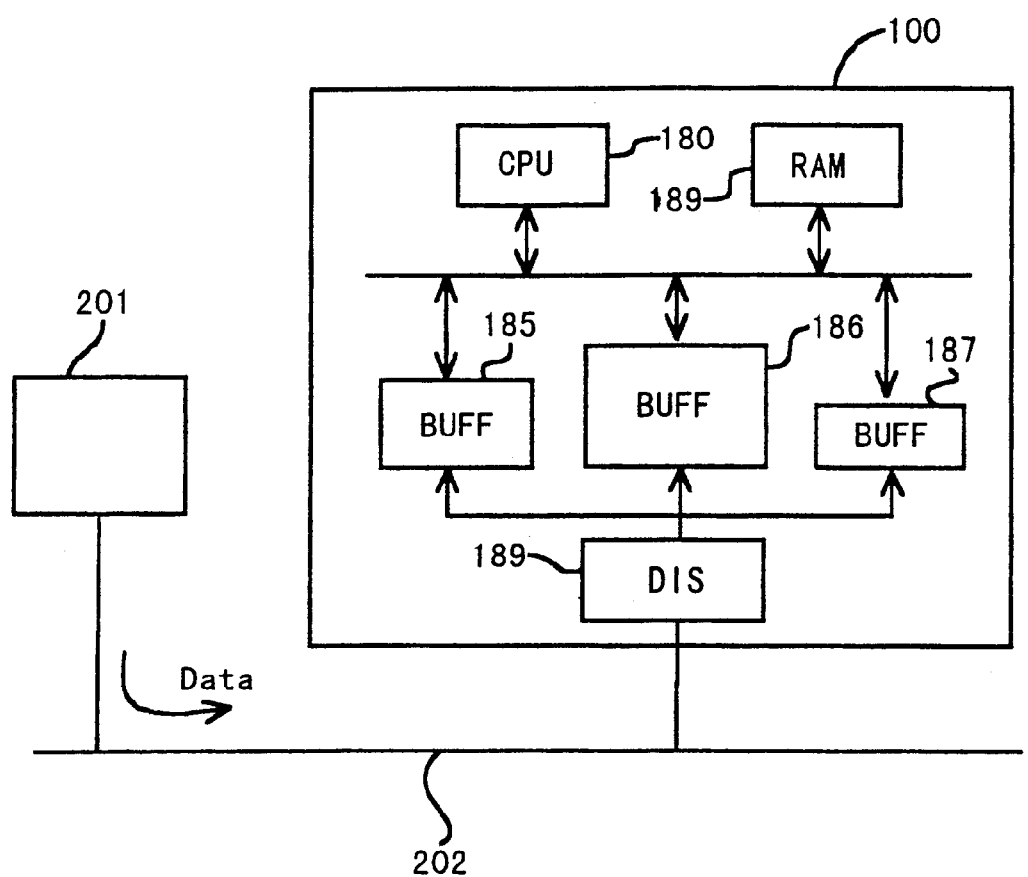
FIG. 22 is an explanatory diagram (II) for conventional data communication.

FIG. 20 is a block diagram illustrating an integrated circuit according to another embodiment of the present second invention. In this embodiment, a CPU 180 can employ software to instruct the division or the non-division of a buffer 102. Only the portion of the embodiment that differs from the arrangement in the embodiment in FIG. 13 will now be described.

In an integrated circuit device 100 in FIG. 20, a buffer division flag is not provided for an address setup controller 191, and an independent buffer division register 104 is included. The CPU 180 controls the buffer division register 104 via a data bus 194 and an address bus 195, and therefore, the CPU 180 can use a software to switch between the division and the non-division of the buffer 102, and a plurality of communication formats can be flexibly handled.

As well as in the embodiment of FIG. 13, the address setup controller 191 sets the buffer division register 104 in accordance with the NAND logic for the full flags FF#0 to FF#3 or the non-inverted logic for the full flag FFM.

As is described above, according to the present invention, the buffer can serve as a single, undivided buffer during the transmission and the reception of data. To read the received data from the buffer, or to write the transmitting data to the buffer, the buffer is logically divided into sub-buffers having sizes corresponding to the data format, so that reading or the writing of data can be performed for the independent sub-buffers. Therefore, a flexible transmission/reception buffer can be provided which can be configured to conform to a variety of different data formats.

What is claimed is:

1. An LSI device comprising:

an FIFO buffer in which transmitting data is written, and from which said transmitting data is output in the order of the writing;

a controller for transmitting said transmitting data to said FIFO buffer in response to a write interrupt signal; and an FIFO controller for generating and outputting said write interrupt signal to said controller in accordance with a state wherein said FIFO buffer is empty, and for variably setting a variable interval for said write interrupt signal.

2. An LSI device according to claim 1, wherein said FIFO controller includes:

a write request generation circuit for generating a first write request signal when the FIFO buffer is in a first empty state, and for generating a second write request signal when the FIFO buffer is in a second empty state of which the size of the empty area is larger than that in said first empty state; and a selector for selecting either said first or said second write request signal generated by said write request generation circuit, and for outputting said write interrupt signal which is selected.

3. An LSI device according to claim 2, wherein said FIFO controller includes an interrupt control circuit for permitting or inhibiting the output of said write interrupt signal depending on an interrupt permission signal from said controller.

4. An LSI device according to claim 2, wherein said write request generation circuit generates said first and said second write request signals in accordance with the relationship existing between a write pointer, for pointing to a write area in said FIFO buffer, and a read pointer, for pointing to a read area in said FIFO buffer.

5. An LSI device according to claim 1, wherein said interval for said write interrupt signal varies in accordance with the assigned priority for a different interrupt signal which is input to said controller.

6. An LSI device according to claim 5, wherein, when said different interrupt signal having a higher priority than said write interrupt signal, occurs at a first frequency, said selector selects said first write request signal; and when said different interrupt signal occurs at a second frequency lower than the first frequency, said selector selects said second write request signal.

* * * * *